US011238447B2

(12) United States Patent
Zhang

(10) Patent No.: US 11,238,447 B2
(45) Date of Patent: Feb. 1, 2022

(54) BLOCKCHAIN TRANSACTIONS WITH RING SIGNATURES

(71) Applicant: Advanced New Technologies Co., Ltd., George Town (KY)

(72) Inventor: Wenbin Zhang, Hangzhou (CN)

(73) Assignee: Advanced New Technologies Co., Ltd., Grand Cayman (KY)

( * ) Notice: Subject to any disclaimer, the term of this patent is extended or adjusted under 35 U.S.C. 154(b) by 5 days.

(21) Appl. No.: 16/805,179

(22) Filed: Feb. 28, 2020

(65) Prior Publication Data

US 2020/0202345 A1 Jun. 25, 2020

Related U.S. Application Data

(63) Continuation of application No. PCT/CN2020/071597, filed on Jan. 11, 2020.

(30) Foreign Application Priority Data

Jun. 26, 2019 (CN) .......................... 2019/10563000.5

(51) Int. Cl.
*G06Q 20/38* (2012.01)
*G06Q 20/06* (2012.01)
(Continued)

(52) U.S. Cl.
CPC ....... *G06Q 20/3825* (2013.01); *G06Q 20/065* (2013.01); *G06Q 20/108* (2013.01);
(Continued)

(58) Field of Classification Search
CPC ............... G06Q 20/065; G06Q 20/108; G06Q 20/3672; G06Q 20/3674; G06Q 20/3678;
(Continued)

(56) References Cited

U.S. PATENT DOCUMENTS

2016/0292680 A1* 10/2016 Wilson, Jr. ............. G06Q 20/40
2016/0330034 A1 11/2016 Back et al.
(Continued)

FOREIGN PATENT DOCUMENTS

CN 107358424 11/2017
CN 104782077 12/2017
(Continued)

OTHER PUBLICATIONS

Ron White, How Computers Work, Oct. 15, 2003, Paul Boger, Illustrated by Timothy Edward Downs, 7th Edition (Year: 2003).*
(Continued)

*Primary Examiner* — John W Hayes
*Assistant Examiner* — Wodajo Getachew
(74) *Attorney, Agent, or Firm* — Fish & Richardson P.C.

(57) ABSTRACT

A method includes: determining, by a computing device communicably coupled to a blockchain network, participants in a remittance transaction, in which each participant has a corresponding account in a blockchain ledger of the blockchain network, and in which each account includes one or more assets; assembling the remittance transaction based on one or more to-be-spent assets of the one or more assets in an account corresponding to a real remitter, one or more covered assets of the one or more assets in an account corresponding to a fake remitter, and one or more encrypted transfer amounts; generating a linkable ring signature for the remittance transaction based on a private key held by the real remitter, a public key held by the real remitter, and a public key held by the fake remitter; and submitting the remittance transaction and the linkable ring signature to the blockchain network for completion.

19 Claims, 12 Drawing Sheets

(51) Int. Cl.
*G06Q 20/10* (2012.01)
*G06Q 20/36* (2012.01)
*G06Q 30/00* (2012.01)
*H04L 9/06* (2006.01)
*H04L 9/08* (2006.01)
*H04L 9/30* (2006.01)
*H04L 9/32* (2006.01)

(52) U.S. Cl.
CPC ..... *G06Q 20/3672* (2013.01); *G06Q 20/3674* (2013.01); *G06Q 20/3678* (2013.01); *G06Q 20/3829* (2013.01); *G06Q 20/38215* (2013.01); *G06Q 30/0185* (2013.01); *H04L 9/0637* (2013.01); *H04L 9/0869* (2013.01); *H04L 9/3033* (2013.01); *H04L 9/3066* (2013.01); *H04L 9/3255* (2013.01); *G06Q 2220/00* (2013.01); *H04L 2209/38* (2013.01)

(58) Field of Classification Search
CPC ......... G06Q 20/38215; G06Q 20/3829; G06Q 20/3825; G06Q 30/0185; G06Q 2220/00; H04L 9/0637; H04L 9/0869; H04L 9/3033; H04L 9/3066; H04L 9/3255; H04L 2209/38
USPC ........................................................... 705/66
See application file for complete search history.

(56) References Cited

U.S. PATENT DOCUMENTS

| | | |
|---|---|---|
| 2016/0358165 A1 | 12/2016 | Maxwell |
| 2018/0060836 A1 | 3/2018 | Castagna |
| 2018/0204192 A1 | 7/2018 | Whaley et al. |
| 2019/0025805 A1 | 1/2019 | Cella et al. |
| 2019/0164153 A1* | 5/2019 | Agrawal ................ H04L 9/008 |

FOREIGN PATENT DOCUMENTS

| | | |
|---|---|---|
| CN | 107453865 | 12/2017 |
| CN | 107911216 | 4/2018 |
| CN | 109034800 | 12/2018 |
| CN | 109087099 | 12/2018 |
| CN | 109377215 | 2/2019 |
| CN | 109544129 | 3/2019 |
| CN | 109743171 | 5/2019 |
| CN | 109919619 | 6/2019 |
| CN | 110189131 | 8/2019 |
| CN | 110335042 | 10/2019 |
| WO | WO 2018189657 | 10/2018 |
| WO | WO 2018224943 | 12/2018 |
| WO | WO 2019021105 | 1/2019 |
| WO | WO 2019116249 | 6/2019 |

OTHER PUBLICATIONS

Alonso, Kurt M., et al. "Zero to Monero: First Edition A Technical Guide to a Private Digital Currency; For Beginners, Amateurs, and Experts," available at: https://www.getmonero.org/library/Zero-to-Monero-1-0-0.pdf (Published Jun. 26, 2108). (Year: 2018).*

Pérez-Solà C, Delgado-Segura S, Navarro-Arribas G, Herrera-Joancomartí J, "Double-spending Prevention for Bitcoin zero-confirmation transactions" (Year: 2019).*

Crosby et al., "BlockChain Technology: Beyond Bitcoin," Sutardja Center for Entrepreneurship & Technology Technical Report, Oct. 16, 2015, 35 pages.

Nakamoto, "Bitcoin: A Peer-to-Peer Electronic Cash System," www.bitcoin.org, 2005, 9 pages.

PCT International Search Report and Written Opinion in International Application No. PCT/CN2020/071597, dated Apr. 13, 2020, 15 pages (with partial machine translation).

* cited by examiner

BLOCKCHAIN TRANSACTIONS WITH RING SIGNATURES

CROSS-REFERENCE TO RELATED APPLICATIONS

This application is a continuation of PCT Application No. PCT/CN2020/071597, filed on Jan. 11, 2020, which claims priority to Chinese Patent Application No. 2019/10563000.5, filed on Jun. 26, 2019, and each application is hereby incorporated by reference in its entirety.

TECHNICAL FIELD

One or more implementations of the present specification relate to the field of blockchain technologies, and in particular, to methods and devices for realizing a confidential blockchain transaction by adopting ring signatures.

BACKGROUND

A blockchain technology (which is also referred to as a distributed ledger technology) is a decentralized distributed database technology, features decentralization, transparency, tamper-resistance, trustworthiness, etc., and is applicable to many application scenarios that require high data reliability.

SUMMARY

In view of this, one or more implementations of the present specification provide methods and devices for realizing a confidential blockchain transaction by adopting ring signatures.

To achieve the previous objective, the one or more implementations of the present specification provide the following technical solutions:

According to a first aspect of the one or more implementations of the present specification, a method for realizing a confidential blockchain transaction by adopting ring signatures is provided, and includes the following: determining all participants of a remittance transaction M, where each participant has a corresponding account in a blockchain ledger, and the account includes an income balance whose value is recorded as a corresponding commitment value and several assets whose asset amounts are recorded as asset commitments; assembling the remittance transaction M based on to-be-spent assets $ID\_j\_1$ to $ID\_j\_m$ in an account corresponding to a real remitter in the participants, covered assets $ID\_i\_1$ to $ID\_i\_m$ in an account corresponding to a fake remitter i, and a commitment value of a transfer amount corresponding to each payee in the participants; generating a linkable ring signature for the remittance transaction M based on a private key $x\_j$ and a public key $P\_j$ held by the real remitter and a public key $P\_i$ held by the fake remitter i, where the linkable ring signature includes key images $I\_1$ to $I\_m$, and values of the key images $I\_1$ to $I\_m$ are related to the private key $x\_j$ and the public key $P\_j$ of the real remitter and asset identifiers $ID\_j\_1$ to $ID\_j\_m$; and submitting the signed remittance transaction M to a blockchain network, where after the transaction is completed, an income balance in an account corresponding to each payee is increased by the corresponding transfer amount, the key images $I\_1$ to $I\_m$ are added to a historical key image set, and the to-be-spent assets $ID\_j\_1$ to $ID\_j\_m$ are maintained and recorded as assets in the account corresponding to the real remitter in the blockchain ledger.

According to a second aspect of the one or more implementations of the present specification, a method for realizing a confidential blockchain transaction by adopting ring signatures is provided, and includes the following: receiving a remittance transaction M, where each participant of the remittance transaction M has a corresponding account in a blockchain ledger, the account includes an income balance whose value is recorded as a corresponding commitment value and several assets whose asset amounts are recorded as asset commitments, and the remittance transaction M is generated by a real remitter in the participants through assembly based on to-be-spent assets $ID\_j\_1$ to $ID\_j\_m$ in an account corresponding to the real remitter, covered assets $ID\_i\_1$ to $ID\_i\_m$ in an account corresponding to a fake remitter i, and a commitment value of a transfer amount corresponding to each payee in the participants; obtaining key images $I\_1$ to $I\_m$ included in a linkable ring signature of the remittance transaction M, where values of the key images $I\_1$ to $I\_m$ are related to a private key $x\_j$ and a public key $P\_j$ of the real remitter and asset identifiers $ID\_j\_1$ to $ID\_j\_m$; verifying the linkable ring signature, where the linkable ring signature is generated by the real remitter based on the private key $x\_j$ and the public key $P\_j$ held by the real remitter and a public key $P\_i$ held by the fake remitter i, and when the verification on the linkable ring signature succeeds, it is determined that inputs and outputs of the remittance transaction M are equal; and executing the remittance transaction M when a transaction execution condition is satisfied, so that an income balance in an account corresponding to each payee is increased by the corresponding transfer amount, where the transaction execution condition includes: the key images $I\_1$ to $I\_m$ do not belong to a historical key image set, and the verification on the linkable ring signature succeeds, the key images $I\_1$ to $I\_m$ are added to the historical key image set after the transaction is completed, and the to-be-spent assets $ID\_j\_1$ to $ID\_j\_m$ are maintained and recorded as assets in the account corresponding to the real remitter in the blockchain ledger.

According to a third aspect of the one or more implementations of the present specification, a device for realizing a confidential blockchain transaction by adopting ring signatures is provided, and includes the following: a participant determining unit, configured to determine all participants of a remittance transaction M, where each participant has a corresponding account in a blockchain ledger, and the account includes an income balance whose value is recorded as a corresponding commitment value and several assets whose asset amounts are recorded as asset commitments; a transaction assembly unit, configured to assemble the remittance transaction M based on to-be-spent assets $ID\_j\_1$ to $ID\_j\_m$ in an account corresponding to a real remitter in the participants, covered assets $ID\_i\_1$ to $ID\_i\_m$ in an account corresponding to a fake remitter i, and a commitment value of a transfer amount corresponding to each payee in the participants; a signature generation unit, configured to generate a linkable ring signature for the remittance transaction M based on a private key $x\_j$ and a public key $P\_j$ held by the real remitter and a public key $P\_i$ held by a fake remitter i, where the linkable ring signature includes key images $I\_1$ to $I\_m$, and values of the key images $I\_1$ to $I\_m$ are related to the private key $x\_j$ and the public key $P\_j$ of the real remitter and asset identifiers $ID\_j\_1$ to $ID\_j\_m$; and a transaction submission unit, configured to submit the signed remittance transaction M to a blockchain network, where after the transaction is completed, an income balance in an account corresponding to each payee is increased by the corresponding transfer amount, the key images $I\_1$ to $I\_m$ are added to a historical key image set, and the to-be-spent assets ID_j_1 to ID_j_m are maintained and recorded as assets in the account corresponding to the real remitter in the blockchain ledger.

According to a fourth aspect of the one or more implementations of the present specification, a device for realizing a confidential blockchain transaction by adopting ring signatures is provided, and includes the following: a transaction receiving unit, configured to receive a remittance transaction M, where each participant of the remittance transaction M has a corresponding account in a blockchain ledger, the account includes an income balance whose value is recorded as a corresponding commitment value and several assets whose asset amounts are recorded as asset commitments, and the remittance transaction M is generated by a real remitter in the participants through assembly based on to-be-spent assets ID_j_1 to ID_j_m in an account corresponding to the real remitter, covered assets ID_i_1 to ID_i_m in an account corresponding to a fake remitter i, and a commitment value of a transfer amount corresponding to each payee in the participants; an image acquisition unit, configured to obtain key images I_1 to I_m included in a linkable ring signature of the remittance transaction M, where values of the key images I_1 to I_m are related to a private key x_j and a public key P_j of the real remitter and asset identifiers ID_j_1 to ID_j_m; a signature verification unit, configured to verify the linkable ring signature, where the linkable ring signature is generated by the real remitter based on the private key x_j and the public key P_j held by the real remitter and a public key P_i held by the fake remitter i, and when the verification on the linkable ring signature succeeds, it is determined that inputs and outputs of the remittance transaction M are equal; and a transaction execution unit, configured to execute the remittance transaction M when a transaction execution condition is satisfied, so that an income balance in an account corresponding to each payee is increased by the corresponding transfer amount, where the transaction execution condition includes: the key images I_1 to I_m do not belong to a historical key image set, and the verification on the linkable ring signature succeeds, the key images I_1 to I_m are added to the historical key image set after the transaction is completed, and the to-be-spent assets ID_j_1 to ID_j_m are maintained and recorded as assets in the account corresponding to the real remitter in the blockchain ledger.

According to a fifth aspect of the one or more implementations of the present specification, an electronic device is provided, and includes the following: a processor; and a memory, configured to store a processor executable instruction, where the processor executes the executable instruction to implement the method according to the first aspect.

According to a sixth aspect of the one or more implementations of the present specification, a computer readable storage medium is provided, where the computer readable storage medium stores a computer instruction, and the instruction is executed by a processor to implement the steps of the method according to the first aspect.

According to a seventh aspect of the one or more implementations of the present specification, an electronic device is provided, and includes the following: a processor; and a memory, configured to store a processor executable instruction, where the processor executes the executable instruction to implement the method according to the second aspect.

According to an eighth aspect of the one or more implementations of the present specification, a computer readable storage medium is provided, where the computer readable storage medium stores a computer instruction, and the instruction is executed by a processor to implement the steps of the method according to the second aspect.

DESCRIPTION OF IMPLEMENTATIONS

Example implementations are described in detail here, and examples of the example implementations are presented in the accompanying drawings. When the following description relates to the accompanying drawings, unless specified otherwise, same numbers in different accompanying drawings represent the same or similar elements. Implementations described in the following example implementations do not represent all implementations consistent with the one or more implementations of the present specification. On the contrary, the implementations are only examples of devices and methods that are described in the appended claims in detail and consistent with some aspects of the one or more implementations of the present specification.

It is worthwhile to note that in other implementations, steps of a corresponding method are not necessarily performed in a sequence shown and described in the present specification. In some other implementations, the method can include more or fewer steps than those described in the present specification. In addition, a single step described in the present specification can be divided into a plurality of steps for description in other implementations, and a plurality of steps described in the present specification can be combined into a single step for description in other implementations.

Figure 1:
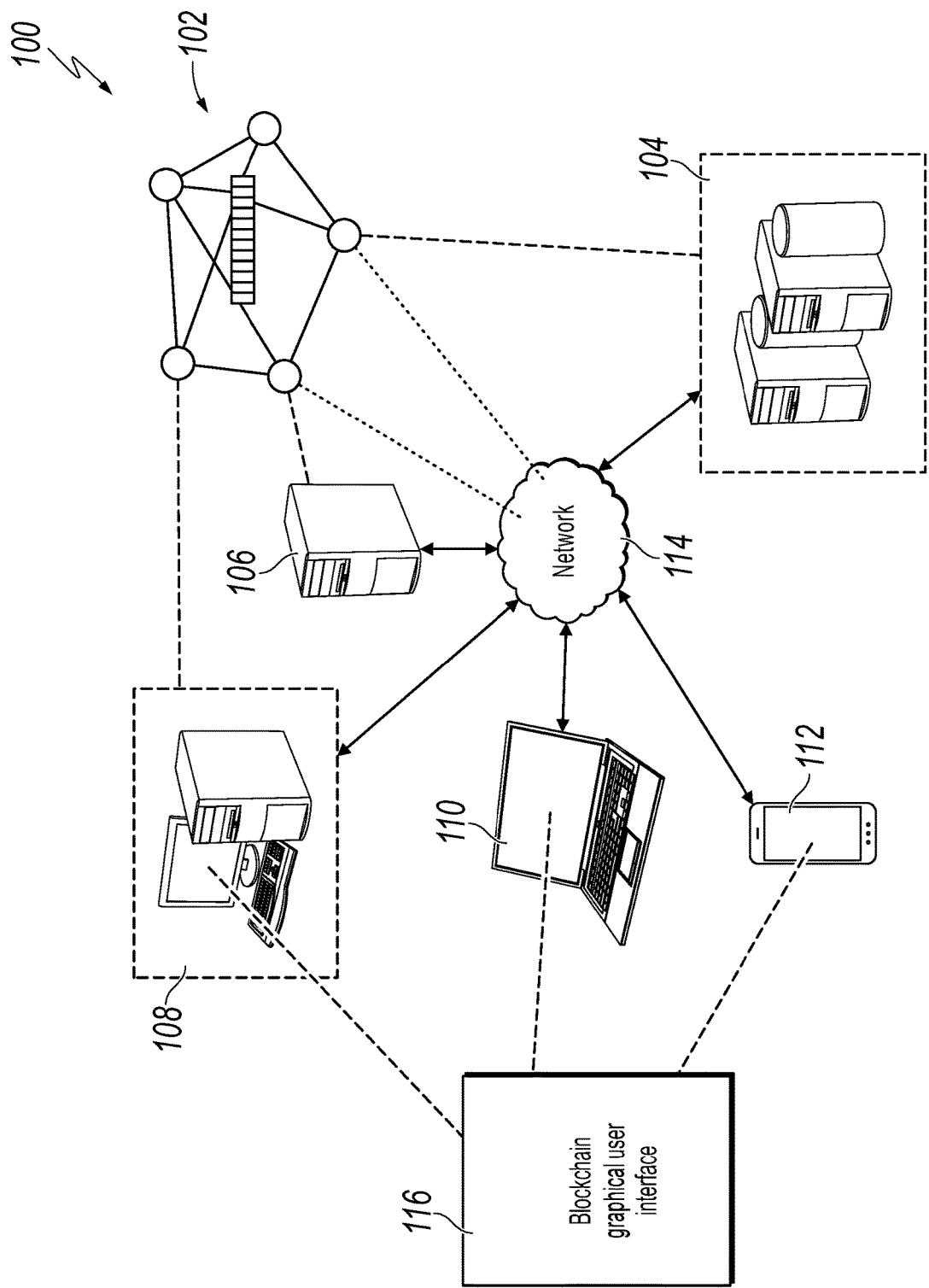
FIG. 1 is a schematic diagram illustrating an example environment, according to an example implementation.

FIG. 1 is a schematic diagram illustrating an example environment, according to an example implementation. As shown in FIG. 1, the example environment 100 allows an entity to participate in a blockchain network 102. The blockchain network 102 can be a public blockchain network, a private blockchain network, or a consortium blockchain network. The example environment 100 can include computing devices 104, 106, 108, 110, and 112 and a network 114. In an implementation, the network 114 can include a local area network (LAN), a wide area network (WAN), the Internet, or a combination thereof, and is connected to a website, user equipment (for example, a computing device), and a backend system. In an implementation, the network 114 can be accessed in a wired and/or wireless communications way.

In some cases, the computing devices 106 and 108 can be nodes (not shown) in a cloud computing system. Alternatively, each of the computing devices 106 and 108 can be a separate cloud computing system, and includes a plurality of computers that are interconnected by using a network and operate as a distributed processing system.

In an implementation, the computing devices 104 to 108 can run any suitable computing system, so that the computing devices 104 to 108 can serve as nodes in the blockchain network 102. For example, the computing devices 104 to 108 can include but are not limited to servers, desktop computers, notebook computers, tablet computer computing devices, and smartphones. In an implementation, the computing devices 104 to 108 can belong to a related entity, and are configured to implement a corresponding service. For example, the service can be used to manage transactions between one or more entities.

In an implementation, each of the computing devices 104 to 108 stores a blockchain ledger corresponding to the blockchain network 102. The computing device 104 can be (or include) a network server configured to provide a browser function, and the network server can provide, based on the network 114, visualized information related to the blockchain network 102. In some cases, the computing device 104 may not participate in block verification, but monitor the blockchain network 102 to determine when other nodes (for example, can include the computing devices 106 to 108) reach a consensus, and generate a corresponding blockchain graphical user interface based on this.

In an implementation, the computing device 104 can receive a request initiated by a client device (for example, the computing device 110 or the computing device 112) for the blockchain graphical user interface. In some cases, a node in the blockchain network 102 can also be used as a client device. For example, a user of the computing device 108 can send the previous request to the computing device 104 by using a browser running on the computing device 108.

In response to the previous request, the computing device 104 can generate the blockchain graphical user interface (for example, a web page) based on the stored blockchain ledger, and send the generated blockchain graphical user interface to the requested client device. If the blockchain network 102 is a private blockchain network or a consortium blockchain network, the request for the blockchain graphical user interface can include user authorization information. Before generating the blockchain graphical user interface and sending the blockchain graphical user interface to the requested client device, the computing device 104 can verify user Authorization information, and return the corresponding blockchain graphical user interface after the verification succeeds.

The blockchain graphical user interface can be displayed on the client device (for example, can be displayed on a user interface 116 shown in FIG. 1). When the blockchain ledger is updated, content displayed on the user interface 116 can also be updated accordingly. In addition, interaction between a user and the user interface 116 can result in a request for another user interface, for example, a block display list, block details, a transaction list, transaction details, an account list, account details, a contract list, contract details, or a search result page generated by searching the blockchain network by the user.

Figure 2:
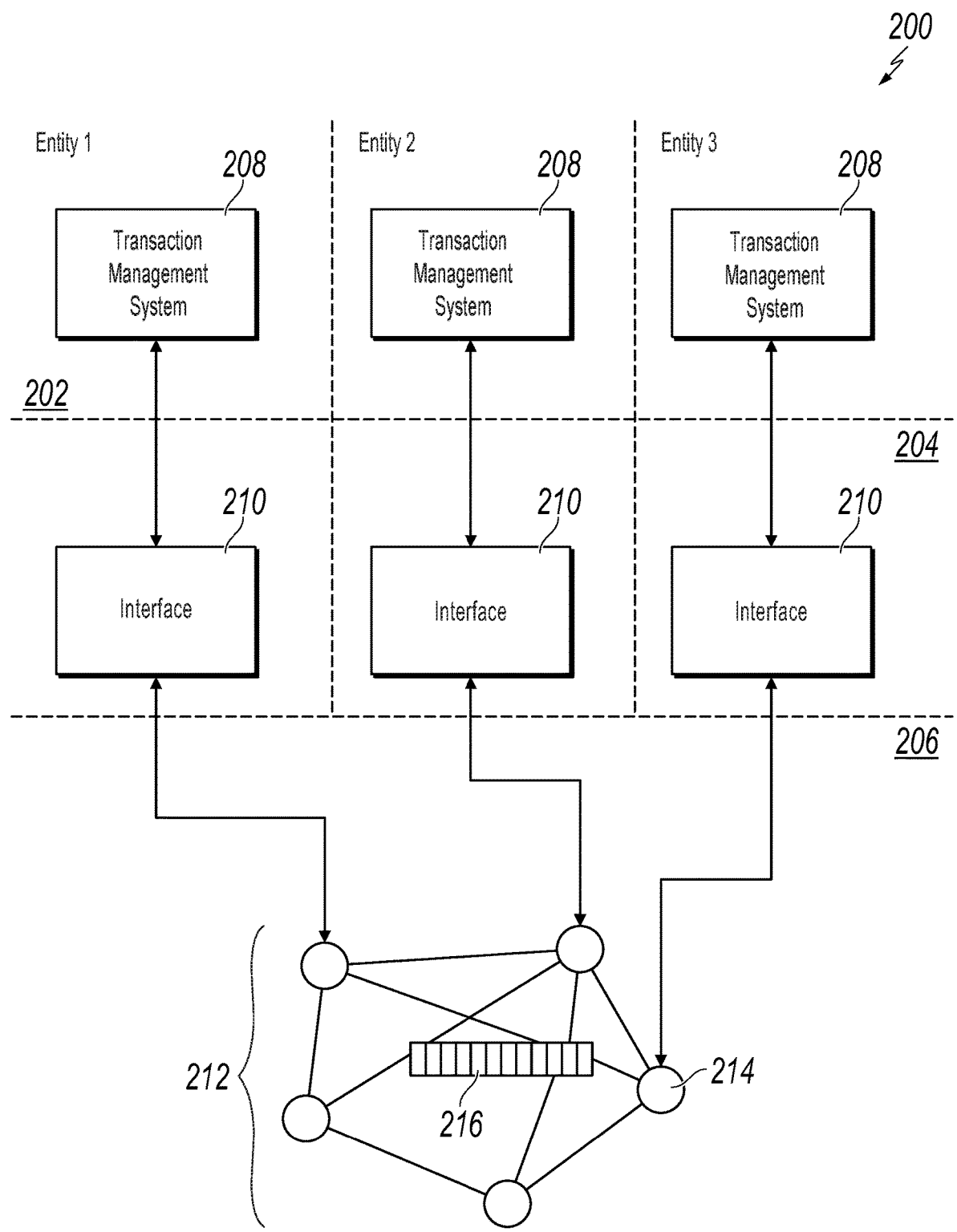
FIG. 2 is a schematic diagram illustrating a conceptual architecture, according to an example implementation.

FIG. 2 is a schematic diagram illustrating a conceptual architecture, according to an example implementation. As shown in FIG. 2, the conceptual architecture 200 includes a physical layer 202, a managed service layer 204, and a blockchain network layer 206. For example, the physical layer 202 can include three entities: entity 1, entity 2, and entity 3, and each entity has its own transaction management system 208.

In an implementation, the managed service layer 204 can include an interface 210 corresponding to each transaction management system 208. For example, each transaction management system 208 communicates with the respective interface 210 over a network (for example, the network 114 in FIG. 1) by using a protocol (for example, Hypertext Transfer Protocol Secure (HTTPS)). In some examples, each interface 210 can provide a communication connection between the transaction management system 208 corresponding to each interface 210 and the blockchain network layer 206. More specifically, the interface 210 can communicate with a blockchain network 212 at the blockchain network layer 206. In some examples, communication between the interface 210 and the blockchain network layer 206 can be implemented by using remote procedure calls (RPCs). In some examples, the interface 210 can provide an API interface for accessing the blockchain network 212 to the transaction management system 208.

As described here, the blockchain network 212 is provided in the form of a peer-to-peer network, the peer-to-peer network includes a plurality of nodes 214, and these nodes 214 are configured to persist a blockchain ledger 216 formed by blockchain data. FIG. 2 shows only one blockchain ledger 216, but there can be a plurality of blockchain ledgers 216 or copies thereof in the blockchain network 212. For example, each node 214 can maintain one blockchain ledger 216 or copy thereof.

It is worthwhile to note that a transaction described in the present specification refers to a piece of data that is created by a user by using a blockchain client and needs to be finally published in a distributed blockchain database. A transaction in a blockchain is a transaction in a narrow sense or a transaction in a broad sense. A transaction in a narrow sense refers to a value transfer published by a user in a blockchain. For example, in a conventional bitcoin blockchain network, a transaction can be a transfer initiated by a user in a blockchain. A transaction in a broad sense refers to service data that is published by a user in a blockchain and is with a service intention. For example, an operator can establish a consortium blockchain based on an actual service demand, and deploy, based on the consortium blockchain, some other types of online services (for example, a rental service, a vehicle scheduling service, an insurance claim service, a credit service, and a medical service) that are not related to value transfer. In the consortium blockchain, a transaction can be a service message or a service request that is published by a user in the consortium blockchain and is with a service intention.

Blockchains are usually classified into three types: a public blockchain, a private blockchain, and a consortium blockchain. In addition, there are a plurality of types of combinations, for example, a combination of a private blockchain+a consortium blockchain and a combination of a consortium blockchain+a public blockchain. The public blockchain has the highest degree of decentralization. The public blockchain is represented by Bitcoin and Ethereum. Participants who join the public blockchain can read data records in the blockchain, participate in transactions, contend for accounting rights of new blocks, and so on. In addition, each participant (namely, node) can freely join and exit the network, and perform related operations. On the contrary, for the private blockchain network, the write permission is controlled by a certain organization or institution, and the data read permission is specified by the organization. In short, the private blockchain can be a weak centralization system with a few quantity of participating nodes and in which the participating nodes are strictly limited. This type of blockchain is more suitable for internal use by a specific institution. The consortium blockchain is a blockchain between the public blockchain and the private blockchain, and can be "partially decentralized". Each node in the consortium blockchain usually corresponds to a physical institution or organization. Participants join the network through authorization and form an interest-related consortium, to jointly maintain running of the blockchain.

By using a distributed architecture used by a blockchain network and a chain structure used by a block, information can be stored in a blockchain ledger maintained by all blockchain nodes permanently and without tamper. However, information privacy cannot be ensured due to full disclosure of the blockchain ledger. For example, any user can query the blockchain ledger on any blockchain node, to learn of information such as assets held in a certain account and a transfer amount of a certain transaction. However, the information may be sensitive and need to be hidden.

To implement privacy protection, a commitment-based anonymous transaction or confidential transaction scheme is proposed in related technologies. An asset amount held in each account, a transfer amount involved in a transaction, etc. can be generated as corresponding commitment amounts, and only the commitment amounts instead of the asset amount, the transaction amount, etc. are recorded in a blockchain ledger. For example, when the Pedersen commitment mechanism is used, and assume that an original amount is t, a corresponding commitment amount can be $PC(t, r)=r\times G+t\times H$, where G and H are random generators of an elliptic curve, and r is a random number. In addition, a value of r is held only by an account holder, a transaction participant, etc., so that an uninvolved person cannot obtain original amount t through reverse calculation only based on a value of $PC(t, r)$. In addition, the commitment amount also has a homomorphic feature, and therefore calculation can be directly performed between commitment amounts. For example, $PC(t1, r1)-PC(t2, r2)=PC(t1-t2, r1-r2)$. However, when verifying a transaction, a blockchain node cannot determine, based on the commitment amount, whether a related condition is satisfied. For example, the related condition is that a collected amount of the transaction is equal to a remitted amount or another condition. Therefore, related proof information needs to be provided to ensure successful completion of the transaction.

In addition, a signature is needed when a user initiates a transaction in a blockchain network. For example, when user A wants to spend an asset held by user A in a blockchain, user A can initiate a blockchain transaction, and add a signature by using a private key $x\_j$ held by user A. Correspondingly, the signature can be verified by using a public key $P\_j$ corresponding to the private key $x\_j$ held by user A. However, direct verification of the signature also indicates that user A is the signer of the corresponding signature, resulting in privacy disclosure of user A.

To protect the identity of the signer, a ring signature-based processing scheme is provided in related technologies. User A can hide the public key $P\_j$ held by user A in a group of public keys $(P\_1, \ldots, P\_n)$, where the public keys $P\_1$ to $P\_j-1$ and $P\_j+1$ to $P\_n$ respectively belong to other users. Then, user A generates a signature by using the private key $x\_j$ held by user A and the group of public keys $(P\_1, \ldots, P\_n)$. In this case, a verifier can verify that the signature is generated by using a private key corresponding to a public key in the group of public keys $(P\_1, \ldots, P\_n)$, but cannot determine a specific public key. Therefore, the identity of the signer is hidden by using the group of public keys $(P\_1, \ldots, P\_n)$.

It can be understood that when the form of $(P\_1, \ldots, P\_n)$ is described above, it appears to be a group of public keys that start from $P\_1$ and end at $P\_n$. However, the verifier actually cannot determine a sequence between the public keys. Therefore, for the verifier, the group of public keys is equivalent to a ring structure presented without a head or a tail, and therefore is referred to as a ring signature.

In the ring signature scheme, the identity of the signer can be hidden, but a "double spending" problem occurs when the ring signature scheme is applied to a transaction scenario of a blockchain network. For example, the blockchain network can perform asset management by using an unspent transaction output (UTXO) model in which a blockchain asset held by a user is recorded as an output of a corresponding transaction, one or more unspent transaction outputs are used as inputs of each transaction, and one or more outputs are correspondingly generated. Typically, the UTXO is applied to bitcoins and derived cryptocurrencies thereof. When the ring signature scheme is applied to a blockchain network based on the UTXO model, the same asset can be referenced by a plurality of transactions. However, because the identity of the signer is hidden in the ring signature scheme, the verifier fails to check that the same asset is referenced repeatedly. Consequently, the "double spending" problem occurs.

Therefore, an improved scheme to the ring signature scheme is provided in related technologies, and is referred to as a linkable spontaneous anonymous group signature (LSAG) scheme in which a key image used to mark a signer can be generated without exposing a public key corresponding to a group of ring signatures used by the signer for a signature. Therefore, the identity of the signer can be hidden, and the "double spending" problem can be alleviated based on the key image.

Monero is used as an example. The Monero implements asset management by using the UTXO model. All assets in the model are transaction outputs of a corresponding blockchain transaction, and all assets generated in a blockchain network are uniformly managed. Each asset uniquely corresponds to a public and private key pair, and a user can spend a corresponding asset by using a held public and private key pair. For example, when an asset held by a signer (for example, a remitter in a remittance transaction) corresponds to private key $x\_j$ and public key $P\_j$, a corresponding key image can be generated based on equation $I=x\_j\times Hash(P\_j)$. Provided that the asset has been previously spent, a blockchain node records a key image with the same value, and therefore a "double spending" problem can be identified.

However, each asset uniquely corresponds to a public and private key pair, and therefore when a transaction includes a plurality of assets, a plurality of corresponding public and private key pairs are needed. For example, when a transaction includes m assets, the signer needs to maintain m public and private key pairs, which greatly increases maintenance costs of the public and private key pairs.

Therefore, the present specification provides a new technical solution, so that a signer can generate a linkable ring signature for a transaction that involves a plurality of assets by maintaining only one public and private key pair, and a demand for proof information in a confidential transaction can be satisfied. The following provides description with reference to implementations.

Figure 3:
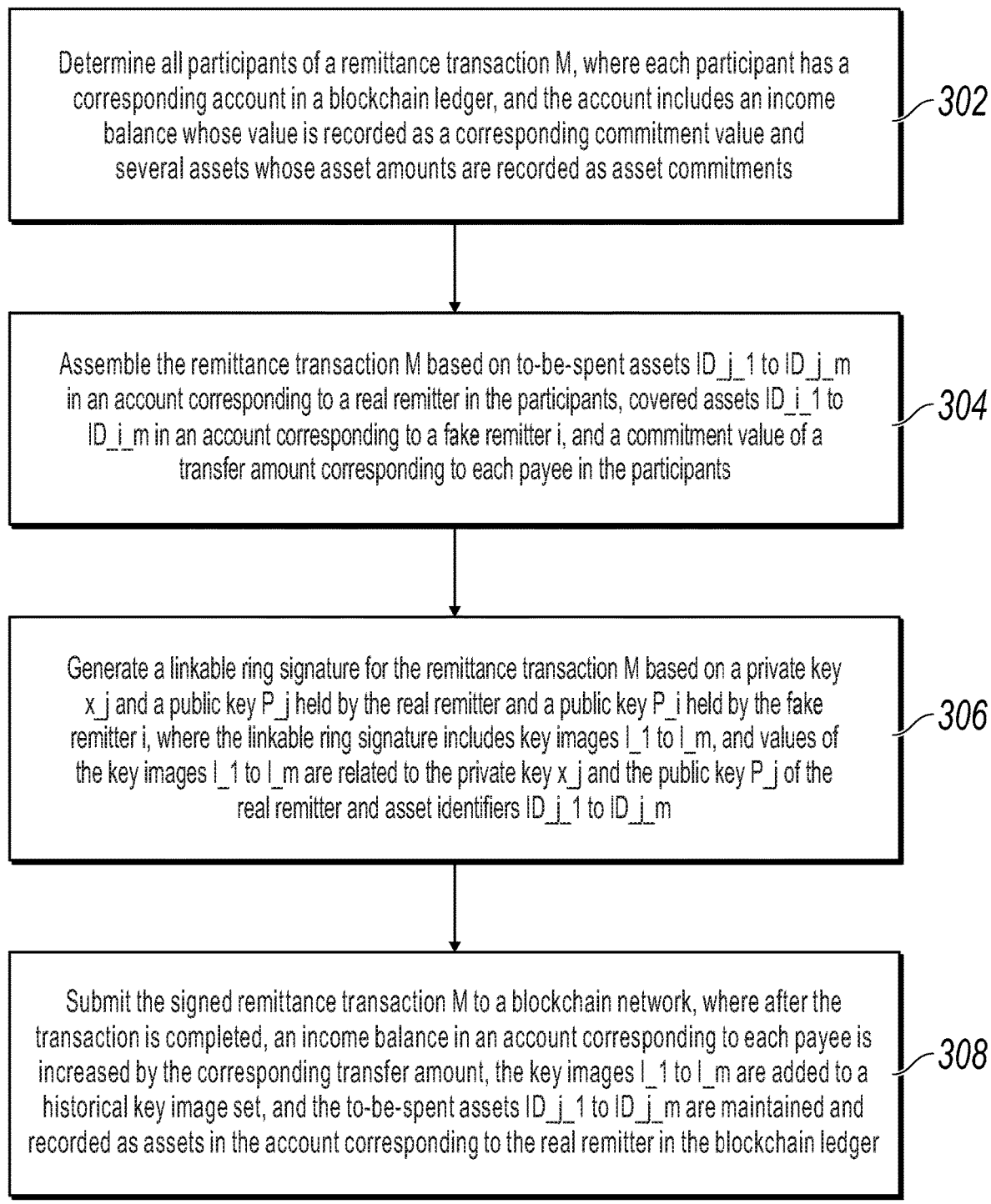
FIG. 3 is a flowchart illustrating a method for realizing a confidential blockchain transaction by adopting ring signatures, according to an example implementation.

FIG. 3 is a flowchart illustrating a method for realizing a confidential blockchain transaction by adopting ring signatures, according to an example implementation. As shown in FIG. 3, the method is applied to a client device, and can include the following steps.

Step 302: Determine all participants of a remittance transaction M, where each participant has a corresponding account in a blockchain ledger, and the account includes an income balance whose value is recorded as a corresponding commitment value and several assets whose asset amounts are recorded as asset commitments.

Figure 4:
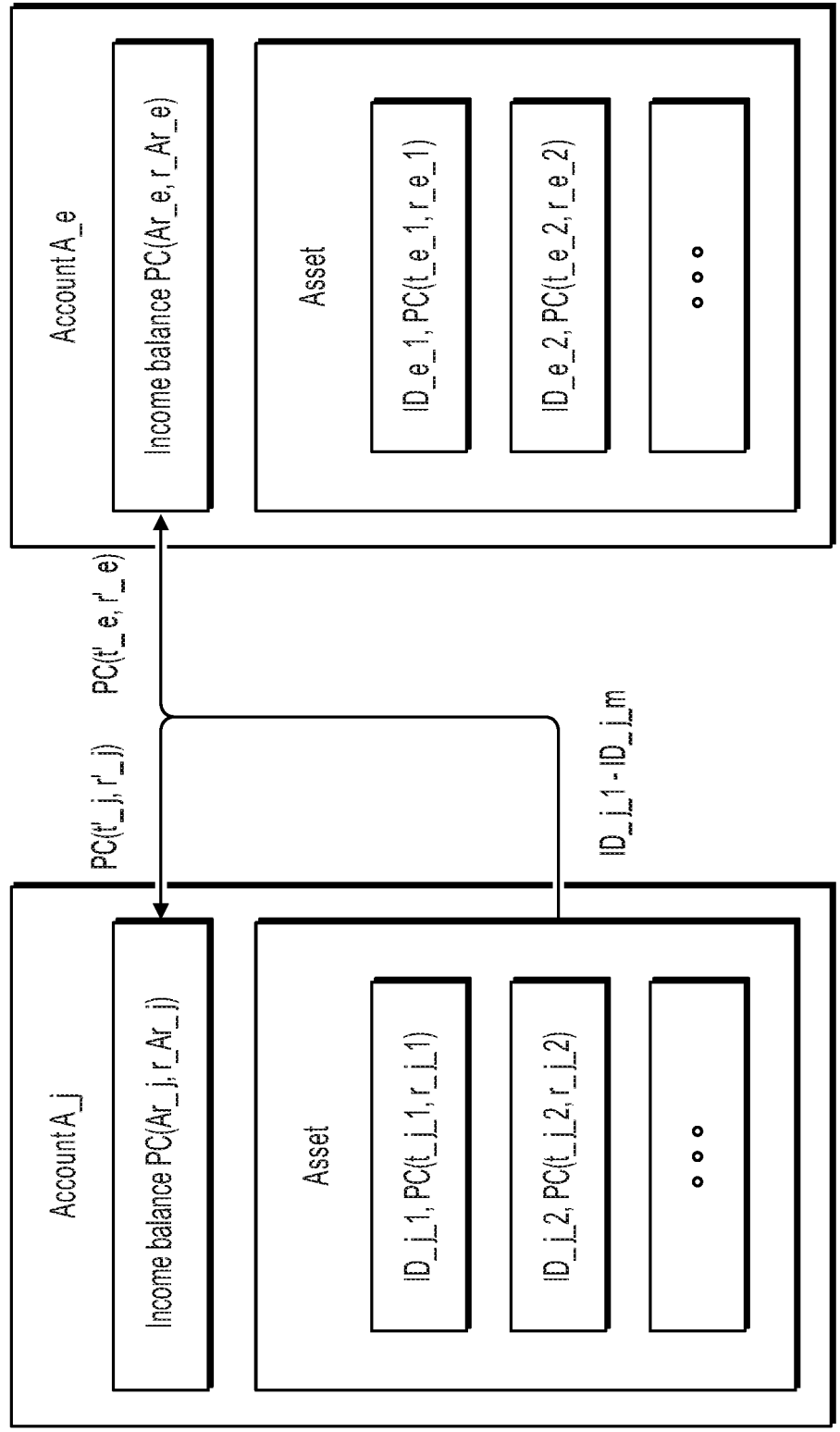
FIG. 4 is a schematic diagram illustrating transferring an asset between accounts, according to an example implementation.

The blockchain ledger includes accounts corresponding to all users in a blockchain network, and funds held by the corresponding users are maintained by using the accounts. For example, FIG. 4 is a schematic diagram illustrating transferring an asset between accounts, according to an example implementation. FIG. 4 shows an account $A\_j$ corresponding to a remitter and an account A e corresponding to a payee. The account $A\_j$ is used as an example, and an account model used by the account includes an "income balance" part and an "asset" part.

The income balance part is similar to an account model used by Ethereum, etc. in related technologies, and is used to directly accumulate fund amounts. For example, when a fund amount corresponding to the income balance is $Ar\_j$ shown in FIG. 4, to keep the fund amount secret, the fund amount is actually recorded as a commitment amount corresponding to the fund amount $Ar\_j$ in the blockchain ledger, for example, a commitment amount $PC(Ar\_j, r\_Ar\_j)$ generated based on the fund amount $Ar\_j$ and a random number $r\_Ar\_j$. The commitment amount $PC(Ar\_j, r\_Ar\_j)$ generated based on the fund amount $Ar\_j$ is random because of the existence of the random number $r\_Ar\_j$. Other users other than the remitter that holds random number the $r\_Ar\_j$ can view only the commitment amount $PC(Ar\_j, r\_Ar\_j)$, and cannot obtain the corresponding fund amount $Ar\_j$ through reverse calculation based on the commitment amount $PC(Ar\_j, r\_Ar\_j)$.

The asset part is similar to a UTXO model, and is used to manage several assets. For example, the asset part can include assets $ID\_j\_1$, $ID\_j\_2$, etc. shown in FIG. 4, where $ID\_j\_1$, $ID\_j\_2$, etc. are asset identifiers of the corresponding assets, and are used to distinguish between the assets. Asset amounts of these assets are respectively $t\_j\_1$, $t\_j\_2$, etc. However, to keep the asset amounts secret, the asset amounts are actually recorded as commitment amounts corresponding to the asset amounts in the blockchain ledger. For example, a commitment amount generated based on the asset amount $t\_j\_1$ and a random number $r\_j\_1$ is $PC(t\_j\_1, r\_j\_1)$, and a commitment amount generated based on the asset amount $t\_j\_2$ and a random number $r\_j\_2$ is $PC(t\_j\_2, r\_j\_2)$. The blockchain ledger can record each asset in the asset part in a form similar to [identifier, asset commitment]. For example, the assets can be recorded as $[ID\_j\_1, PC(t\_j\_1, r\_j\_1)]$ and $[ID\_j\_2, PC(t\_j\_2, r\_j\_2)]$ shown in FIG. 4. Implementations are not limited in the present specification. The commitment amounts $PC(t\_j\_1, r\_j\_1)$ and $PC(t\_j\_2, r\_j\_2)$ generated based on the asset amounts $t\_j\_1$ and $t\_j\_2$ are random because of the existence of the random numbers $r\_j\_1$ and $r\_j\_2$. Other users other than the remitter that holds the random numbers $r\_j\_1$ and $r\_j\_2$ can view only the commitment amounts $PC(t\_j\_1, r\_j\_1)$ and $PC(t\_j\_2, r\_j\_2)$, and cannot obtain the corresponding asset amounts $t\_j\_1$ and $t\_j\_2$ through reverse calculation based on the commitment amounts $PC(t\_j\_1, r\_j\_1)$ and $PC(t\_j\_2, r\_j\_2)$.

Similar to the account $A\_j$, the account A e shown in FIG. 4 also includes an income balance part and an asset part. The income balance part is recorded in the blockchain ledger as a commitment amount $PC(Ar\_e, r\_Ar\_e)$ generated based on a fund amount $Ar\_e$ and a random number $r\_Ar\_e$, and the asset part is recorded in the blockchain ledger as $[ID\_e\_1, PC(t\_e\_1, r\_e\_1)]$, $[ID\_e\_2, PC(t\_e\_2, r\_e\_2)]$, etc., where $ID\_e\_1$ and $ID\_e\_2$ are asset identifiers. A commitment amount $PC(t\_e\_1, r\_e\_1)$ is generated based on an asset amount $t\_e\_1$ and a random number $r\_e\_1$, and a commitment amount $PC(t\_e\_2, r\_e\_2)$ is generated based on an asset amount $t\_e\_2$ and a random number $r\_e\_2$.

Certainly, the blockchain ledger may not record an asset in the form of [identifier, asset commitment]. For example, when there are a plurality of asset types, an asset can be recorded and stored in a form similar to [type, identifier, asset commitment]. In the process of calculating an asset amount, executing a transaction, etc., the impact of the asset type needs to be considered, for example, conversion of asset amounts of different types of assets. Furthermore, in addition to directly recording the "asset commitment", other information can be stored. The asset $ID\_j\_1$ is used as an example, and can be recorded as $[ID\_j\_1, E(t\_j\_1, r\_j\_1)]$, where $E(t\_j\_1, r\_j\_1)=[PC(t\_j\_1, r\_j\_1), E(t\_j\_1), E(r\_j\_1)]$, and $E(t\_j\_1)$ and $E(r\_j\_1)$ are homomorphic ciphertext respectively corresponding to the asset amount $t\_j\_1$ and the random number $r\_j\_1$, and can be obtained by respectively encrypting the asset amount $t\_j\_1$ and the random number $r\_j\_1$ by using a homomorphic encryption public key (obtained by performing homomorphic encryption on a public key $P\_j$) of the remitter. For ease of understanding, the following provides description by using an example in the asset form of [identifier, asset commitment].

Step 304: Assemble the remittance transaction M based on to-be-spent assets $ID\_j\_1$ to $ID\_j\_m$ in an account corresponding to a real remitter in the participants, covered assets $ID\_i\_1$ to $ID\_i\_m$ in an account corresponding to a fake remitter i, and a commitment value of a transfer amount corresponding to each payee in the participants.

As described above, the to-be-spent assets $ID\_j\_1$ to $ID\_j\_m$ can be recorded as $[ID\_j\_1, PC(t\_j\_1, r\_j\_1)]$ to $[ID\_j\_m, PC(t\_j\_m, r\_j\_m)]$ in the blockchain ledger, and the covered assets $ID\_i\_1$ to $ID\_i\_m$ can be recorded as $[ID\_i\_1, PC(t\_i\_1, r\_i\_1)]$ to $[ID\_i\_m, PC(t\_i\_m, r\_i\_m)]$ in the blockchain ledger, where $r\_j\_1$ to $r\_j\_m$ and $r\_i\_1$ to $r\_i\_m$ are random numbers.

The participants include both the real remitter and the fake remitter i, the remittance transaction M is assembled based on the to-be-spent assets $ID\_j\_1$ to $ID\_j\_m$ in the account corresponding to the real remitter and the covered assets $ID\_i\_1$ to $ID\_i\_m$ in the account corresponding to the fake remitter i, and a linkable ring signature is generated in the following, so that the identity of the real remitter can be hidden by using the fake remitter i, and therefore other users cannot determine a user who is in the "real remitter and the fake remitter i" and spends an asset.

The to-be-spent assets $ID\_j\_1$ to $ID\_j\_m$ can be any assets held by the real remitter, and the covered assets ID_i_1 to ID_i_m can be any assets held by the fake remitter i. Certainly, when the to-be-spent assets ID_j_1 to ID_j_m are actually selected, a remitted amount involved in the remittance transaction M also needs to be referred to, and it needs to ensure that the sum of asset amounts of the to-be-spent assets is not less than the remitted amount. The remitted amount is the amount that the remitter needs to transfer to real payees. The amount is determined by the real remitter and the real payees in advance through negotiation, or can be independently determined by the real remitter.

From the perspective of money input of the remittance transaction M, roles of the real remitter and the fake remitter are involved. From the perspective of money output, roles of the real payee and a fake payee are involved. Some of these roles may overlap.

For the real remitter and the fake remitter, the remittance transaction M is assembled based on the to-be-spent assets ID_j_1 to ID_j_m in the account corresponding to the real remitter and the covered assets ID_i_1 to ID_i_m in the account corresponding to the fake remitter i, and the linkable ring signature is generated in the following, so that the identity of the real remitter can be hidden by using the fake remitter i, and therefore other users cannot determine a user who is in the "real remitter and the fake remitter i" and spends an asset. Here, the fake remitter can include a participant other than the real remitter. For example, the fake remitter can include the real payee of the remittance transaction M. For example, when the real remitter is user A, and real payees are user B and user C, user B and user C are configured as fake remitters. Therefore, the identity of user A can be hidden by using user B and user C, and even a better confusion effect can be achieved because user B and user C are both "a remitter" and "a payee". For another example, the fake remitter can include a participant other than the real remitter and the real payee. For example, when the real remitter is user A, and real payees are user B and user C, irrelevant user D can be configured as the fake remitter, to hide the identity of user A. Still for another example, the fake remitter can include both the real payee and another user. For example, when the real remitter is user A, and real payees are user B and user C, user B, user C, and user D can be configured as fake remitters, to hide the identity of user A.

For the real payee and the fake payee:

In an implementation, the payees of the remittance transaction M can include only the real payee. In one case, when there is no change in the balance, the real payee include only an initial remittance object, namely, an object initially determined to execute a transaction with the real remitter. In this case, the sum of asset amounts t_j_1 to t_j_m corresponding to the to-be-spent assets ID_j_1 to ID_j_m is exactly equal to the sum of transfer amounts of initial remittance objects, in other words, there is no change in the balance. In another case, when there is change in the balance, the real payee include the real remitter and an initial remittance object. A difference between the sum of asset amounts t_j_1 to t_j_m corresponding to the to-be-spent assets ID_j_1 to ID_j_m and the sum of transfer amounts of initial remittance objects is a change amount.

In another implementation, in addition to the real payee, the payees of the remittance transaction M can include the fake payee. In one case, the fake payee can include the real remitter, but there is no change in the balance in this case. In another case, the fake payee can include a participant other than the real remitter and the real payee. By setting a transfer amount corresponding to the fake payee to 0, impact on the real payee can be avoided. In addition, transfer amounts of all the payees are corresponding homomorphic ciphertext, and therefore the identity of the real payee can be hidden by using the fake payee.

Based on an actual situation, the identity of the real remitter can be hidden by using only the fake remitter, or the identity of the real payee can be further hidden by using the fake payee. In an implementation, the participants of remittance transaction M can include the real remitter, the real payee, and a cover party distinguished from the real remitter and the real payee. These users constitute n participants in total, and the n participants are involved in remittance and collection of the remittance transaction. For the real remitter, the real payee and the cover party are fake remitters, and for the real payee, the real remitter and the cover party are fake payees, and therefore identities of both the real remitter and the real payee are hidden. In addition, each participant participates in both remittance and collection, and therefore identity confusion can be implemented between the remitter and the payee, thereby further increasing the reliability of identity hiding.

Assume that the payees of the remittance transaction M are Q_1 to Q_u, and corresponding transfer amounts are t'_1 to t'_u, where $1 \leq u \leq n$. In the remittance transaction M, similar to the asset amounts t_j_1 to t_j_m corresponding to the previous to-be-spent assets, the transfer amounts t'_1 to t'_u are respectively recorded as corresponding transfer amount commitments PC(t'_1, r'_1) to PC(t'_u, r'_u) in the remittance transaction M, where r'_1 to r'_u are random numbers. The random numbers r'_1 to r'_u can be determined by the real remitter, and are notified to the corresponding payees (usually notified only to the real payee) through, for example, an offchain channel, so that the payees can perform verification based on the random numbers r'_1 to r'_u. For example, real payee w can verify whether PC(t'_w, r'_w)=t'_w×G+r'_w×H.

In a confidential transaction, it is necessary to prove that each of the transfer amounts t'_1 to t'_u in the remittance transaction M is not less than 0. The real remitter can generate corresponding range proofs RP_1 to RP_u for the transfer amounts t'_1 to t'_u by using a zero-knowledge proof technology in related technologies, to prove that t'_1 to t'_u$\geq$0, and add these range proofs RP_1 to RP_u to transaction content of the remittance transaction M. The used zero-knowledge proof technology can be a range proof technology such as a Bulletproofs scheme. Implementations are not limited in the present specification.

Step 306: Generate a linkable ring signature for the remittance transaction M based on a private key x_j and a public key P_j held by the real remitter and a public key P_i held by the fake remitter i, where the linkable ring signature includes key images I_1 to I_m, and values of the key images I_1 to I_m are related to the private key x_j and the public key P_j of the real remitter and asset identifiers ID_j_1 to ID_j_m.

The real remitter needs to maintain a public and private key pair, such as the private key x_j and the public key P_j. Before the public and private key pair is determined, a number field Z_q and an elliptic curve in the number field need to be determined, for example, elliptic curve Ed25519. It is set that G and H are two random generators of the elliptic curve, where |G|=p is a large prime number (for example, is not less than a predetermined value), the private key x_j of the real remitter is selected from a value range (0, p), and the corresponding public key is P_j=x_j×G. A public and private key pair uniquely corresponding to each of other participants is determined in a similar way.

The key images I_1 to I_m are in a one-to-one mapping relationship with the to-be-spent assets ID_j_1 to ID_j_m provided by the real remitter, and are respectively used to verify whether the corresponding to-be-spent assets have been spent, to alleviate a "double spending" problem. The values of the key images I_1 to I_m are related to the asset identifiers ID_j_1 to ID_j_m of the corresponding assets. Therefore, even if all the key images use the same public and private key pair (namely, the private key x_j and the public key P_j of the real remitter), it can also be ensured, based on differences between values of the asset identifiers ID_j_1 to ID_j_m, that the generated key images I_1 to I_m are entirely different. Therefore, there is no need to maintain a public and private key pair for all assets, and a quantity of public and private key pairs that need to be maintained by each account can be made irrelevant to a quantity of assets included in a transaction when the "double spending" problem is alleviated. For example, I_d=x_j×Hash_G(P_j, ID_j_d), where d∈[1, m], and Hash_G( ) is a hash function from the elliptic curve to itself.

It can be calculated that P'''_j=[PC(t_j_1, r_j_1)± . . . +PC(t_j_m, r_j_m)]−[PC(t'_1, r'_1)± . . . +PC(t'_u, r'_u)] based on the asset commitments PC(t_j_1, r_j_1) to PC(t_j_m, r_j_m) corresponding to the to-be-spent assets and the transfer amount commitments PC(t'_1, r'_1) to PC(t'_u, r'_u); it can be calculated that r''=(r_j_1+ . . . +r_j_m)(r'_1+ . . . +r'_u) based on random numbers r_j_1 to r_j_m corresponding to the to-be-spent assets and random numbers r'_1 to r'_u corresponding to the transfer amounts; and it can be calculated that t''= (t_j_1+ . . . +t_j_m)(t'_1+ . . . +t'_u) based on the asset amounts t_j_1 to t_j_m corresponding to the to-be-spent assets and the transfer amounts t'_1 to t'_u. Then, based on the homomorphic feature described above, it can be determined that P'''_j=PC(r'', t'')=r''×G+t''×H. Because the real remitter needs to ensure that t_j_1+ . . . +t_j_m=t'_1+ . . . +t'_u, t''=0, and therefore it can be determined that P'''_j=r''×G.

In this case, it can be seen in terms of form that P'''_j=r''×G is similar to relationship "P_j=x_j×G" of the public and private key pair, and as described below, the fake remitter i necessarily satisfies P'''_i≠r''×G. Therefore, r'' can be considered as a private key corresponding to the real remitter, and P'''_j is a public key corresponding to r''. To distinguish from the public and private key pair corresponding to the real remitter, r'' can be considered as a pseudo private key corresponding to the real remitter, and P'''_j can be considered as a pseudo public key corresponding to the real remitter. Similarly, P'''_i can be considered as a pseudo public key corresponding to the fake remitter i. For example, the parameter P'''_i corresponding to the fake remitter i can be calculated, where P'''_i=[PC{i, 1}+ . . . +PC{i, m}]−[PC (t'_1, r'_1)+ . . . +PC(t'_u, r'_u)], and i∈[1, j−1]∪[j+1, n]. In addition, the difference t''_i between the sum of asset amounts corresponding to the m assets held by fake remitter i and the sum of transfer amounts t'_1 to t'_u can be calculated, and the difference r''_i between the sum of random numbers corresponding to the m assets held by the fake remitter i and the sum of random numbers r'_1 to r'_u corresponding to the transfer amounts t'_1 to t'_u can be calculated.

It can be determined that P'''_i=r''_i×G+t''_i×H≠r''×G based on the homomorphic feature. It can be seen that both the parameters P'''_j and r'' uniquely correspond to the real remitter and the parameter P'''_i uniquely corresponds to the fake remitter i. Therefore, r'' can be considered as the pseudo private key corresponding to the real remitter, P'''_j can be considered as the pseudo public key corresponding to the real remitter, and P'''_i can be considered as the pseudo public key corresponding to the fake remitter i.

The linkable ring signature is generated for the remittance transaction M based on the private key x_j, the public key P_j, the pseudo private key r'', and the pseudo public key P'''_j corresponding to the real remitter and the public key P_i and the pseudo public key P'''_i corresponding to the fake remitter i, to efficiently and compactly implement the following two verification functions. The pseudo public key P'''_j and the pseudo private key r'' satisfy P'''_j=r''×G, and the pseudo public key P'''_i and the pseudo private key r'' satisfy P'''_i≠r''×G, and therefore when the linkable ring signature is generated based on the pseudo private key r'' and the pseudo public keys P'''_j and P'''_i, if verification on the linkable ring signature succeeds, it can be proved that there is a pseudo public key whose value is equal to r''×G in pseudo public keys (P'''_1, . . . , P'''_n), and the pseudo public key corresponds to t''=0, so that inputs and outputs of the remittance transaction M are equal. In addition, when the linkable ring signature is generated based on the private key x_j and the public key P_j corresponding to the real remitter and the public key P_i corresponding to the fake remitter i, if verification on the linkable ring signature succeeds, it can be proved that the linkable ring signature is obtained through signature by using a private key corresponding to a public key in public keys (P_1, . . . , P_n), thereby completing identity verification without exposing the identity of the real remitter. Certainly, if it is not considered whether inputs and outputs of the remittance transaction M are equal, the linkable ring signature can be directly generated based on the private key x_j and the public key P_j corresponding to the real remitter and the public key P_i corresponding to the fake remitter i without using the pseudo private key r'' and the pseudo public key P'''_j corresponding to the real remitter and the pseudo public key P'''_i corresponding to the fake remitter i. Implementations are not limited in the present specification.

In addition to the key images I_1 to I_m, the real remitter can further generate a key image I_(m+1)=r''×Hash_G(P'''_j) based on the pseudo private key r'' and the pseudo public key P'''_j, to constitute m+1 key images with the key images I_1 to I_m to alleviate the "double spending" problem. Actually, because values of both the pseudo private key r'' and the pseudo public key P'''_j are random, the pseudo private keys r'' and the pseudo public keys P'''_j generated by different transactions are necessarily different. Therefore, when the key image I_(m+1) is generated based on the pseudo private key r'' and the pseudo public key P'''_j, there can be a one-to-one mapping relationship between the key image I_(m+1) and a corresponding transaction. In this case, the key image I_(m+1) is compared with a historical key image, to identify a replay problem for the remittance transaction M. If the key image I_(m+1) has the same historical key image, it indicates that the remittance transaction M is replayed.

Step 308: Submit the signed remittance transaction M to a blockchain network, where after the transaction is completed, an income balance in an account corresponding to each payee is increased by the corresponding transfer amount, the key images I_1 to I_m are added to a historical key image set, and the to-be-spent assets ID_j_1 to ID_j_m are maintained and recorded as assets in the account corresponding to the real remitter in the blockchain ledger.

After receiving the remittance transaction M, the blockchain node can compare the key images I_1 to I_m with the historical key image set, to determine whether the historical key image set includes historical key images that are the same as the key images I_1 to I_m. The historical key image set is used to store a key image corresponding to an asset that has been previously spent. If there is a historical key image that is the same as a key image in the key images I_1 to I_m, it indicates that an asset corresponding to the key image has been spent, in other words, a "double spending" problem occurs, and execution of the remittance transaction M should be prevented. If the key images I_1 to I_m do not belong to the historical key image set, it indicates that none of the assets ID_j_1 to ID_j_m corresponding to the key images I_1 to I_m is spent, and when another transaction execution condition is satisfied, the remittance transaction M can be executed. In addition, after the remittance transaction M is completed, the assets ID_j_1 to ID_j_m corresponding to the key images I_1 to I_m are all spent, and therefore the key images I_1 to I_m need to be added to the historical key image set, to subsequently detect a "double spending" problem related to the key images I_1 to I_m.

In an account model used, for example, by Ethereum, after a remitter has spent an amount of money by using a transaction, an account balance in a corresponding account is updated immediately, that is, the amount of spent money is deducted, to ensure accuracy of the account balance. However, in the technical solution of the present specification, after the remittance transaction M is completed, although the assets ID_j_1 to ID_j_m in the account corresponding to the real remitter are spent, the account corresponding to the real remitter is not immediately updated, that is, there is no need to immediately delete the assets ID_j_1 to ID_j_m in the account corresponding to the real remitter, so that when any user queries the account corresponding to the real remitter by using the blockchain ledger, no asset change is detected after the remittance transaction M is completed, to avoid exposing, based on the asset change, the real identity assumed by the real remitter in the remittance transaction M. In addition, although the account corresponding to the real remitter includes both spent and unspent assets, based on maintenance of the historical key image set, it can be ensured that the real remitter can actually spend only the unspent asset and a "double spending" operation performed by the real remitter on the spent asset can be accurately detected.

Certainly, to avoid an increase that is in costs of maintenance by the blockchain node and caused by excessive accumulation of assets in an account and to facilitate management of assets in an account of each user by the user, the user can clear spent assets in the account of the user. The real remitter is used as an example. The real remitter can initiate an asset deletion request to the blockchain network, to delete at least some of assets that have been spent by the real remitter from the blockchain ledger. For example, the real remitter can specify an asset identifier corresponding to an asset that needs to be deleted. Alternatively, the real remitter can specify a time period (can specify two endpoints of the time period, where if only the left endpoint is specified, the time period is from a moment corresponding to the left endpoint to the current moment; or if only the right endpoint is specified, the time period is from a moment at which the account is created to a moment corresponding to the right endpoint), and all assets generated or spent in the time period are deleted.

After the remittance transaction M is completed, the transfer amount is transferred to the account of each payee. In the present specification, the account model shown in FIG. 4 is used. Therefore, the transfer amount is actually transferred to the "income balance" in the corresponding account, and the income balance is increased by the corresponding transfer amount. For the fake payee, the transfer amount corresponding to the fake payee is 0, and therefore it is equivalent to that an income balance in the account corresponding to the fake payee remains unchanged. In addition, the transfer amount is added to the "income balance" part instead of the "asset" part, and therefore there is no asset whose asset amount is 0 in the account corresponding to the fake payee, thereby avoiding an increase in maintenance costs of the account.

It can be seen from the previous description that the remittance transaction M generated by the real remitter can include the following transaction content:

(1) the real remitter, the fake remitter i, and assets: {[P_1: ID_1_1, . . . , ID_1_$m$], [P_2: ID_2_1, . . . , ID_2_$m$], . . . , and [P_n: ID_n_1, . . . , ID_n_m]}, where P_1 to P_n are public keys of the real remitter and the fake remitter, for example, the public key P_j corresponding to the real remitter and the public key P_i corresponding to the fake remitter i, and i∈[1, j−1]∪[j+1, n];

(2) payees and transfer amounts of the payees: {[Q_1, PC(t'_1, r'_1)], [Q_2, PC(t' 2, r'_2)], . . . , and [Q_u, PC(t'_u, r'_u)]}; and (3) the range proofs RP_1 to RP_u.

Certainly, the remittance transaction M can further include other transaction content needed in the blockchain network. References can be made to related demands in related technologies. Examples are omitted here for simplicity.

Then, the real remitter can perform hash calculation on the transaction content of the remittance transaction M. The parameter M can represent a calculated hash value, and the real remitter can generate a linkable ring signature for the hash value M. Certainly, the real remitter can alternatively directly generate a linkable ring signature for the entire transaction content, which can result in a larger calculation amount.

Figure 5:
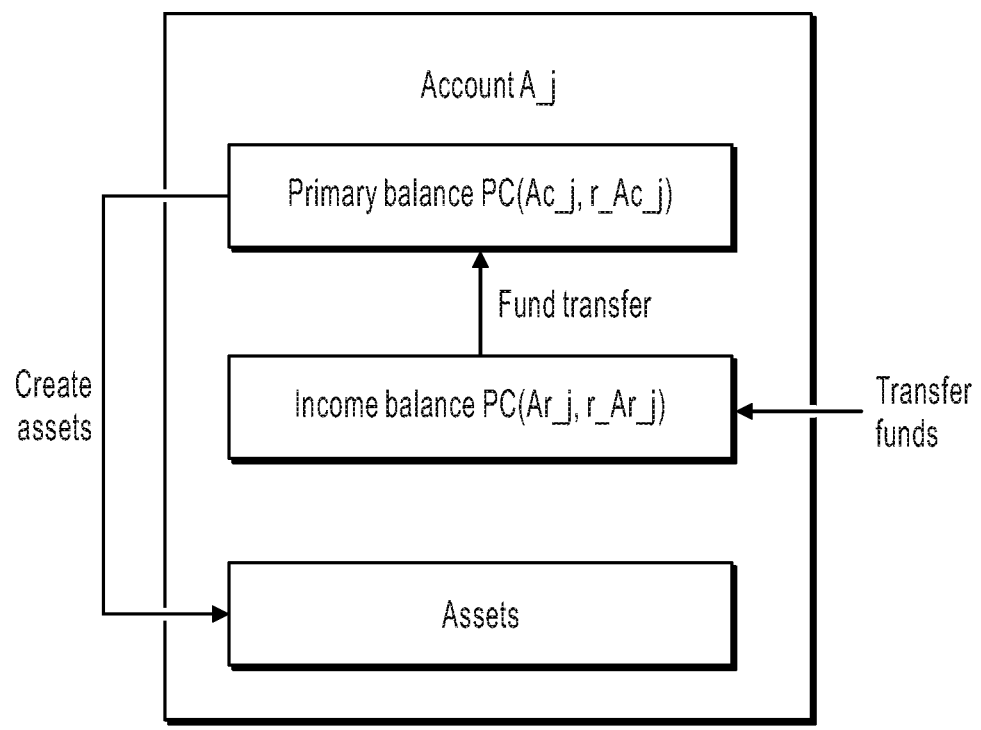
FIG. 5 is a schematic diagram illustrating an account model, according to an example implementation.

Based on the account model shown in FIG. 4, when there are insufficient assets in an account corresponding to a participant, at least a part of an income balance in the corresponding account can be allocated to generate corresponding assets. The account model shown in FIG. 4 can further change. For example, FIG. 5 is a schematic diagram illustrating an account model, according to an example implementation. As shown in FIG. 5, in addition the "income balance" part and the "asset" part shown in FIG. 4, the account model can further include a "primary balance" part. The account A_j is used as an example. A fund amount corresponding to a primary balance of account A_j is Ac_j, the fund amount Ac_j is recorded as a corresponding commitment amount PC(Ac_j, r_Ac_j) in the blockchain ledger, where r_Ac_j is a random number, and the income balance is recorded as a commitment amount PC(Ar_j, r_Ar_j). In this case, a relationship between the primary balance, the income balance, and assets in the account A_j can include the following: Resources transferred to the account A_j are combined into the income balance, at least a part of the primary balance is allocated to create assets, at least a part of the income balance can be transferred to the primary balance (for example, the income balance can be periodically combined into the primary balance) to supplement the primary balance, and the assets are used for transfer to other accounts by using transactions, thereby implementing fund flow. Certainly, in some cases, the primary balance can be used to absorb collected funds, the income balance can be used to create assets, and at least a part of the primary balance can be transferred to the income balance. Implementations are not limited in the present specification. The previously described fund transfer, asset creation, asset consumption, etc. need to be implemented by initiating a corresponding blockchain transaction.

Figure 6:
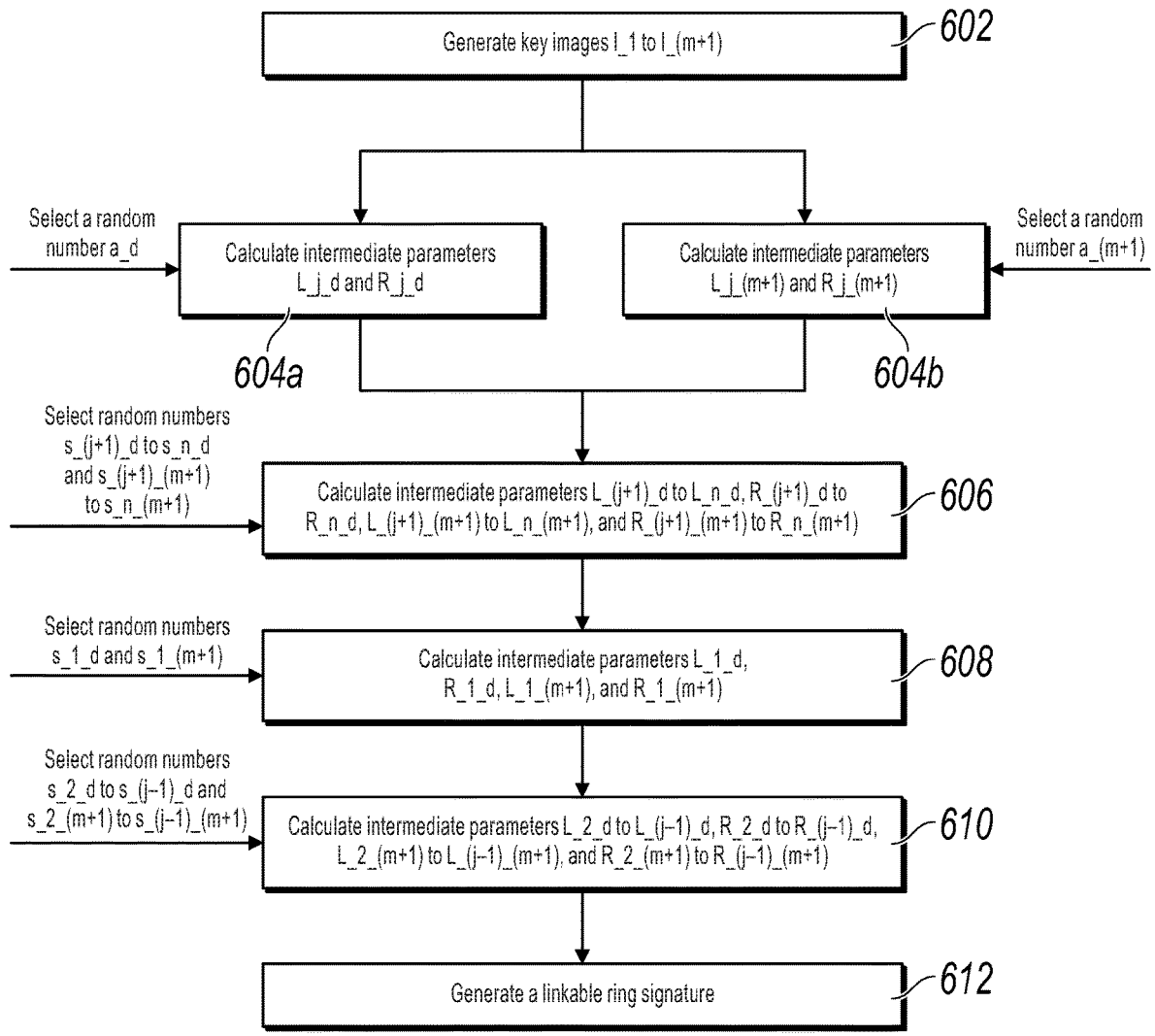
FIG. 6 is a flowchart illustrating generating a linkable ring signature, according to an example implementation.

With reference to FIG. 6, the following describes the process of generating the linkable ring signature for the remittance transaction M based on the private key x_j, the public key P_j, the pseudo private key r″, and the pseudo public key P″_j corresponding to the real remitter and the public key P_i and the pseudo public key P″_i corresponding to the fake remitter i. FIG. 6 is a flowchart illustrating generating a linkable ring signature, according to an example implementation. As shown in FIG. 6, the following steps can be included.

Step 602: Generate the key images I_1 to I_(m+1).

For the process of generating the key images I_1 to I_(m+1), references can be made to the previous content. Details are omitted here for simplicity.

For the key images, I_d=x_j×Hash_G(P_j, ID_j_d), where d∈[1, m], and I_(m+1)=r″×Hash_G(P″_j).

Step 604a: Calculate intermediate parameters L_j_d and R_j_d.

The real remitter can select a random number a_d (namely, a_1 to a_m) from the number field Z_q, and calculate the intermediate parameters L_j_d and R_j_d based on the following equations:

$$L\_j\_d = a\_d \times G; \text{ and}$$

$$R\_j\_d = a\_d \times \text{Hash\_G}(P\_j, \text{ID}\_j\_d).$$

Therefore, the real remitter can calculate L_j_d: L_j_1 to L_j_m and R_j_d: R_j_1 to R_j_m.

Further, that the real remitter can generate intermediate parameters L_j_d and R_j_d corresponding to the fake remitter i includes the following: respectively generating intermediate parameters L_i_d and R_i_d based on values of the intermediate parameters L_j_d and R_j_d, which is described in the following steps 606 to 610.

Step 604b: Calculate intermediate parameters L_j_(m+1) and R_j_(m+1).

The real remitter can select a random number a_(m+1) from the number field Z_q, and calculate intermediate parameters L_j_(m+1) and R_j_(m+1) based on the following equations:

$$L\_j\_(m+1) = a\_(m+1) \times G; \text{ and}$$

$$R\_j\_(m+1) = a(m+1) \times \text{Hash\_G}(P''\_j).$$

Therefore, the real remitter can calculate L_j_(m+1) and R_j_(m+1). Further, the real remitter can generate intermediate parameters L_i_(m+1) and R_i_(m+1) corresponding to the fake remitter i, which is described in the following steps 606 to 610.

Step 606: Calculate intermediate parameters L_(j+1)_d to L_n_d, R_(j+1)_d to R_n_d, L_(j+1)_(m+1) to L_n_(m+1), and R_(j+1)_(m+1) to R_n_(m+1).

When i=j+1 to n, the calculation process of the intermediate parameters L_i_d and R_i_d satisfies the following equations:

$$L\_i\_d = (s\_i\_d \times G + c\_i \times P\_i) \bmod p; \text{ and}$$

$$R\_i\_d = [s\_i\_d \times \text{Hash\_G}(P\_i, \text{ID}\_i\_d) + c\_i \times I\_d] \bmod p.$$

In addition, the calculation process of the intermediate parameters L_i_(m+1) and R_i_(m+1) satisfies the following equations:

$$L\_i\_(m+1) = [s\_i\_(m+1) \times G + c\_i \times P''\_i] \bmod p; \text{ and}$$

$$R\_i\_(m+1) = [s\_i\_(m+1) \times \text{Hash\_G}(P''\_i) + c\_i \times I\_(m+1)] \bmod p.$$

In the calculation process, s_(j+1)_d to s_n_d and s_(j+1)_(m+1) to s_n_(m+1) are involved, and are all random numbers in the number field Z_q. In addition, in the calculation process, c_(j+1) to c_n are involved, and the calculation process of c_(j+1) to c_n satisfies the following equation: c_i=Hash[M, L_(i−1)_1, R(i−1)_1, ..., L_(i−1)_(m+1), R(i−1)_(m+1)], where Hash( ) is a hash function from the previous elliptic curve to the number field Z_q.

When L_j_d, R_j_d, L_j_(m+1), and R_j_(m+1) are calculated in steps 604a and 604b, the intermediate parameters L_i_d and R_i_d, namely, L_(j+1)_d to L_n_d and R_(j+1)_d to R_n_d, are calculated based on L_j_d and R_j_d when i∈[j+1, n]. Specifically, c_(j+1)=Hash[M, L_j_1, R_j_1, ..., L_j_(m+1), R_j_(m+1)] is first calculated based on values of L_j_d, R_j_d, L_j_(m+1), and R_j_(m+1), and L_(j+1)_d and R_(j+1)_d are calculated based on the random number s_(j+1)_d and calculated c_(j+1), that is, L_(j+1)_1 and R_(j+1)_1 are calculated based on the random number s_(j+1)_1 and calculated c_(j+1), L_(j+1)_2 and R_(j+1)_2 are calculated based on the random number s_(j+1)_2 and calculated c_(j+1), ..., and L_(j+1)_m and R_(j+1)_m are calculated based on the random number s_(j+1)_2 and calculated c_(j+1). Then, c_(j+2) is calculated based on values of L_(j+1)_d and R_(j+1)_d, L_(j+2)_d and R_(j+2)_d are calculated based on the random number s_(j+2)_d and calculated c_(j+2), and by analog, until L_n_d and R_n_d are calculated.

Similarly, the intermediate parameters L_(j+1)_(m+1) to L_n_(m+1) and R_(j+1)_(m+1) to R_n_(m+1) can be calculated based on the previous equations and based on the random number s_i_(m+1), the pseudo public key P″_i, calculated c_i, and the key image I_(m+1). Details are omitted here for simplicity.

Step 608: Calculate intermediate parameters L_1_d, R_1_d, L_1_(m+1), and R_1_(m+1).

The calculation process of the intermediate parameters L_1_d and R_1_d satisfies the following equations:

$$L\_1\_d = (s\_1\_d \times G + c\_1 \times P\_1) \bmod p; \text{ and}$$

$$R\_1\_d = (s\_1\_d \times \text{Hash\_G}(P\_1, \text{ID}\_1\_d) + c\_1 \times I\_d) \bmod p.$$

The calculation process of the intermediate parameters L_1_(m+1) and R_1_(m+1) satisfies the following equations:

$$L\_1\_(m+1) = [s\_1\_(m+1) \times G + c\_1 \times P''\_1] \bmod p; \text{ and}$$

$$R\_1\_(m+1) = [s\_1\_(m+1) \times \text{Hash\_G}(P\_1) + c\_1 \times I\_(m+1)] \bmod p.$$

Both s_1_d and s_1_(m+1) are random numbers in the number field Z_q, and c_1=Hash[M, L_n_1, R_n_1, ..., L_n_(m+1), R_n_(m+1)]. The intermediate parameters satisfy a ring value rule. Although for ease of description, the intermediate parameters are expressed as L_1_d to L_n_d, R_1_d to R_n_d, L_1_(m+1) to L_n_(m+1), and R_1_(m+1) to R_n_(m+1), L_1_d, R_1_d, L_1_(m+1), and R_1_(m+1) are not necessarily arranged in the first position, and L_n_d, R_n_d, L_n_(m+1), and R_n_(m+1) are not necessarily arranged in the last position. Actually, it should be considered that L_1_d is adjacent to L_n_d, R_1_d is adjacent to R_n_d, L_1_(m+1) is adjacent to L_n_(m+1), and R_1_(m+1) is adjacent to R_n_(m+1). Therefore, when c_1=Hash[M, L_n_1, R_n_1, ..., L_n_(m+1), R_n_(m+1)], c_i=Hash[M, L_(i−1)_1, R(i−1)_1, ..., L_(i−1)_(m+1), R(i−1)_(m+1)] described in step 606 is also satisfied. In other words, the calculation equation of c_1 is the same as calculation equations of c_(j+1) to c_n.

Step 610: Calculate intermediate parameters $L\_2\_d$ to $L\_(j-1)\_d$, $R\_2\_d$ to $R\_(j-1)\_d$, $L\_2\_(m+1)$ to $L\_(j-1)\_(m+1)$, and $R\_2\_(m+1)$ to $R\_(j-1)\_(m+1)$.

When $i=2$ to $j-1$, the calculation process of the intermediate parameters $L\_i\_d$ and $R\_i\_d$ satisfies the following equations:

$$L\_i\_d = (s\_i\_d \times G + c\_i \times P\_i) \bmod p; \text{ and}$$

$$R\_i\_d = (s\_i\_d \times \text{Hash}\_G(P\_i, ID\_i\_d) + c\_i \times I\_d) \bmod p.$$

In addition, the calculation process of the intermediate parameters $L\_i\_(m+1)$ and $R\_i\_(m+1)$ satisfies the following equations:

$$L\_i\_(m+1) = [s\_i\_(m+1) \times G + c\_i \times P''\_i] \bmod p;$$

$$R\_i\_(m+1) = [s\_i\_(m+1) \times \text{Hash}\_G(P''\_i) + c\_i \times I\_(m+1)] \bmod p.$$

In the calculation process, $s\_2\_d$ to $s\_(j-1)\_d$ and $s\_2\_(m+1)$ to $s\_(j-1)\_(m+1)$ are involved, and are all random numbers in the number field $Z\_q$. In addition, in the calculation process, $c\_2$ to $c\_(j-1)$ are involved, and the calculation process of $c\_2$ to $c\_(j-1)$ satisfies the following equation: $c\_i = \text{Hash}(M, L\_(i-1)\_1, R(i-1)\_1, \ldots, L\_(i-1)\_(m+1), R(i-1)\_(m+1))$.

Therefore, when $L\_1\_d$, $R\_1\_d$, $L\_1\_(m+1)$, and $R\_1\_(m+1)$ are calculated in step 608, the intermediate parameters $L\_i\_d$ and $R\_i\_d$, namely, $L\_2\_d$ to $L\_(j-1)\_d$ and $R\_2\_d$ to $R\_(j-1)\_d$, can be calculated based on $L\_1\_d$, $R\_1\_d$, $L\_1\_(m+1)$, and $R\_1\_(m+1)$ when $i \in [2, j-1]$. Specifically, $c\_2$ is first calculated based on values of $L\_1\_d$, $R\_1\_d$, $L\_1\_(m+1)$, and $R\_1\_(m+1)$, and $L\_2\_d$ and $R\_2\_d$ are calculated based on the random number $s\_2\_d$ and calculated $c\_2$, that is, $L\_2\_1$ and $R\_2\_1$ are calculated based on the random number $s\_2\_1$ and calculated $c\_2$, $L\_2\_2$ and $R\_2\_2$ are calculated based on the random number $s\_2\_2$ and calculated $c\_2$, …, and $L\_2\_m$ and $R\_2\_m$ are calculated based on the random number $s\_2\_m$ and calculated $c\_2$. Then, $c\_3$ is calculated based on values of $L\_2\_d$ and $R\_2\_d$, $L\_3\_d$ and $R\_3\_d$ are calculated based on the random number $s\_3\_d$ and calculated $c\_3$, and by analogy, until $L\_(j-1)\_d$ and $R\_(j-1)\_d$ are calculated.

Similarly, the intermediate parameters $L\_2\_(m+1)$ to $L\_(j-1)\_(m+1)$ and $R\_2\_(m+1)$ to $R\_(j-1)\_(m+1)$ can be calculated based on the previous equations and based on the random number $s\_i\_(m+1)$, the pseudo public key $P'''\_i$, calculated $c\_i$, and the key image $I\_(m+1)$. Details are omitted here for simplicity.

Step 612: Generate a linkable ring signature.

Based on the processing process of the steps, the key images $I\_1, \ldots,$ and $I\_(m+1)$, $c\_1$, $s\_1\_d$ to $s\_(j-1)\_d$, $s\_(j+1)\_d$ to $s\_n\_d$, $s\_1\_(m+1)$ to $s\_(j-1)\_(m+1)$, and $s\_(j+1)\_(m+1)$ to $s\_n\_(m+1)$ can be obtained, and $s\_j\_d$ and $s\_j\_(m+1)$ need to be calculated by the signer based on the following equations:

$$s\_j\_d = (a\_d - c\_j \times x\_j) \bmod p;$$

$$s\_j\_(m+1) = (a\_(m+1) - c\_j \times r'') \bmod p; \text{ and}$$

$$c\_j = \begin{cases} \text{Hash}[M, L\_n\_1, R\_n\_1, \ldots, L\_n\_(m+1), R\_n\_(m+1)], & j=1 \\ \text{Hash}[M, L\_(j-1)\_1, R\_(j-1)\_1, \ldots, L\_(j-1)\_(m+1), R\_(j-1)\_(m+1)], & j \in [2, n]. \end{cases}$$

Although there are two cases for a value of $c\_j$ in the previous equation, a value of the parameter $j$ is actually fixed, for example, the value of the parameter $j$ is fixed to 1 or is fixed to a value in $[2, n]$. This should be distinguished from previous parameters $i$ and $e$ (the parameter $i$ has $n-1$ values: 1 to $j-1$ and $j+1$ to $n$, and the parameter $e$ has $m$ values: 1 to $m$). In addition, similar to the description of $c\_1$, the intermediate parameters satisfy the ring value rule. Although for ease of description, the intermediate parameters are expressed as $L\_1\_d$ to $L\_n\_d$, $R\_1\_d$ to $R\_n\_d$, $L\_1\_(m+1)$ to $L\_n\_(m+1)$, and $R\_1\_(m+1) \sim R\_n\_(m+1)$, $L\_1\_d$, $R\_1\_d$, $L\_1\_(m+1)$, and $R\_1\_(m+1)$ are not necessarily arranged in the first position, and $L\_n\_d$, $R\_n\_d$, $L\_n\_(m+1)$, and $R\_n\_(m+1)$ are not necessarily arranged in the last position. Actually, it should be considered that $L\_1\_d$ is adjacent to $L\_n\_d$, $R\_1\_d$ is adjacent to $R\_n\_d$, $L\_1\_(m+1)$ is adjacent to $L\_n\_(m+1)$, and $R\_1\_(m+1)$ is adjacent to $R\_n\_(m+1)$. Therefore, when $c\_1 = \text{Hash}(M, L\_n\_1, R\_n\_1, \ldots, L\_n\_(m+1), R\_n\_(m+1))$, $c\_j = \text{Hash}(M, L\_(j-1)\_1, R\_(j-1)\_1, \ldots, L\_(j-1)\_(m+1), R\_(j-1)\_(m+1))$ is also satisfied.

Therefore, the real remitter can generate the ring signature $[I\_1, \ldots, I\_(m+1), c\_1, s\_1\_1, \ldots, s\_1\_(m+1), \ldots, s\_n\_1, \ldots, s\_n\_(m+1)]$, and the ring signature includes the key images $I\_1$ to $I\_(m+1)$, random numbers $s\_i\_1$ to $s\_i\_(m+1)$, derived values $s\_j\_1$ to $s\_j\_(m+1)$, and $c\_1$.

Figure 7:
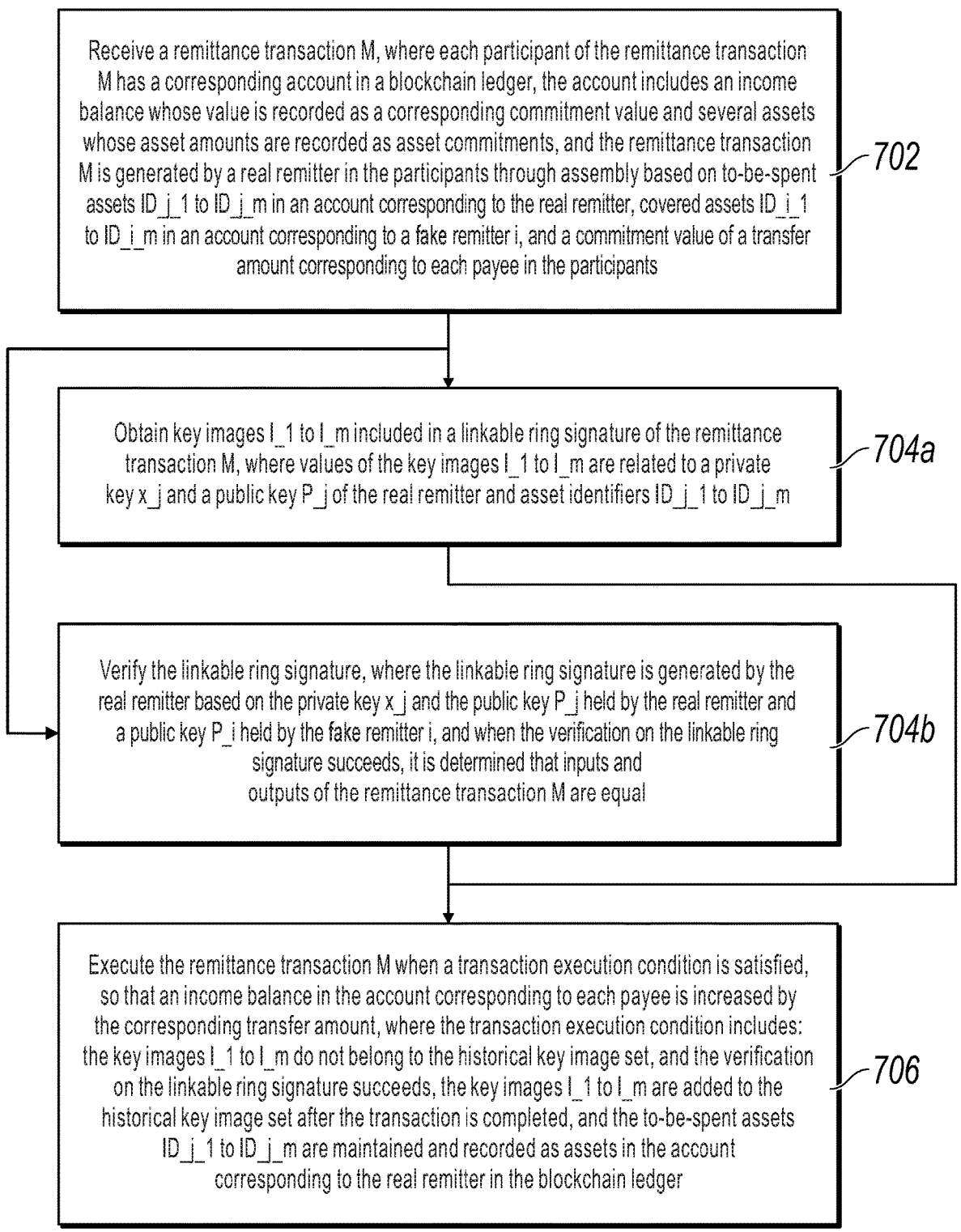
FIG. 7 is a flowchart illustrating another method for realizing a confidential blockchain transaction by adopting ring signatures, according to an example implementation.

FIG. 7 is a flowchart illustrating another method for realizing a confidential blockchain transaction by adopting ring signatures, according to an example implementation. As shown in FIG. 7, the method is applied to a blockchain node. The blockchain node verifies the linkable ring signature generated in the implementation shown in FIG. 3, and performs another necessary verification operation on remittance transaction M. The method can include the following steps.

Step 702: Receive a remittance transaction M, where each participant of the remittance transaction M has a corresponding account in a blockchain ledger, the account includes an income balance whose value is recorded as a corresponding commitment value and several assets whose asset amounts are recorded as asset commitments, and the remittance transaction M is generated by a real remitter in the participants through assembly based on to-be-spent assets $ID\_j\_1$ to $ID\_j\_m$ in an account corresponding to the real remitter, covered assets $ID\_i\_1$ to $ID\_i\_m$ in an account corresponding to a fake remitter $i$, and a commitment value of a transfer amount corresponding to each payee in the participants.

As described above, an asset held by a user is managed in the form of an "account" in the present specification. In the account model shown in FIG. 4, an account includes an "income balance" part and an "asset" part. In the account model shown in FIG. 5, an account includes an "income balance" part, an "asset" part, and a "primary balance" part. Fund amounts corresponding to both the "income balance" part and the "primary balance" part are recorded as corresponding commitment amounts in the blockchain ledger, and an asset amount of each asset included in the "asset" part is also recorded as a corresponding commitment amount in the blockchain ledger. For details, references can be made to related description that is with reference to FIG. 4 or FIG. 5. Details are omitted here for simplicity.

For "assets", the to-be-spent assets $ID\_j\_1$ to $ID\_j\_m$ are used as an example, and $ID\_j\_1$ to $ID\_j\_m$ are asset identifiers, and are used to distinguish between different assets. Assume that asset amounts of the to-be-spent assets $ID\_j\_1$ to $ID\_j\_m$ are $t\_j\_1$ to $t\_j\_m$. In this case, asset commitments $PC(t\_j\_1, r\_j\_1)$ to $PC(t\_j\_m, r\_j\_m)$ corresponding to the asset amounts t_j_1 to t_j_m can be recorded in the blockchain ledger, where r_j_1 to r_j_m are random numbers. The asset commitments PC(t_j_1, r_j_1) to PC(t_j_m, r_j_m) generated based on the amounts t_j_1 to t_j_m are random because of the existence of random numbers r_j_1 to r_j_m. Other users other than the real remitter that holds the random numbers r_j_1 to r_j_m can view only the asset commitments PC(t_j_1, r_j_1) to PC(t_j_m, r_j_m), and cannot obtain the corresponding asset amounts t_j_1 to t_j_m through reverse calculation based on the asset commitments PC(t_j_1, r_j_1) to PC(t_j_m, r_j_m).

Similarly, for the covered assets ID_i_1 to ID_i_m, ID_i_1 to ID_i_m are asset identifiers, and are used to distinguish between different assets. Assume that asset amounts of the covered assets ID_i_1 to ID_i_m are t_i_1 to t_i_m. In this case, asset commitments PC(t_i_1, r_i_1) to PC(t_i_m, r_i_m) corresponding to the asset amounts t_i_1 to t_i_m can be recorded in the blockchain ledger, where r_i_1 to r_i_m are random numbers. For example, a fake remitter 1 holds covered assets ID_1_1 to ID_1_*m*, and corresponding asset amounts are t_1_1 to t_1_*m*. In this case, asset commitments PC(t_1_1, r1_1) to PC(t_1_*m*, r_1_*m*) corresponding to the asset amounts t_1_1 to t_1_*m* can be recorded in the blockchain ledger, where r_1_1 to r_1_*m* are random numbers held only by the fake remitter 1.

For example, an asset can be recorded and stored in the blockchain ledger in a form similar to [identifier, asset commitment]. For example, the to-be-spent assets ID_j_1 to ID_j_m can be recorded as [ID_j_1, PC(t_j_1, r_j_1)] to [ID_j_m, PC(t_j_m, r_j_m)], and the covered assets ID_i_1 to ID_i_m corresponding to the fake remitter i can be recorded as [ID_i_1, PC{i, 1}] to [ID_i_m, PC{i, m}]. Certainly, this is only an example, and another form can be used in the blockchain ledger. For example, when there are a plurality of asset types, an asset can be recorded and stored in a form similar to [type, identifier, asset commitment]. In the process of calculating an asset amount, executing a transaction, etc., the impact of the asset type needs to be considered, for example, conversion of asset amounts of different types of assets. Furthermore, in addition to directly recording the "asset commitment", other information can be stored. The to-be-spent asset ID_j_m is used as an example, and can be recorded as [ID_j_m, E(t_j_m, r_j_m)], where E(t_j_m, r_j_m)=[PC(t_j_m, r_j_m), E(t_j_m), E(r_j_m)], and E(t_j_m) and E(r_j_m) are homomorphic ciphertext respectively corresponding to the asset amount t_j_m and the random number r_j_m, and can be obtained by respectively encrypting the asset amount t_j_m and the random number r_j_m by using a homomorphic encryption public key (obtained by performing homomorphic encryption on a public key P_j) of the real remitter. For ease of understanding, the following provides description by using an example in the asset form of [identifier, asset commitment].

From the perspective of money input of the remittance transaction M, roles of the real remitter and the fake remitter are involved. From the perspective of money output, roles of a real payee and a fake payee are involved. Some of these roles may overlap.

For the real remitter and the fake remitter, the remittance transaction M is assembled based on the to-be-spent assets ID_j_1 to ID_j_m in the account corresponding to the real remitter and the covered assets ID_i_1 to ID_i_m in the account corresponding to the fake remitter i, and a linkable ring signature is generated in the following, so that the identity of the real remitter can be hidden by using the fake remitter i, and therefore other users cannot determine a user who is in the "real remitter and the fake remitter i" and spends an asset. Here, the fake remitter can include a participant other than the real remitter. For example, the fake remitter can include the real payee of the remittance transaction M. For example, when the real remitter is user A, and real payees are user B and user C, user B and user C are configured as fake remitters. Therefore, the identity of user A can be hidden by using user B and user C, and even a better confusion effect can be achieved because user B and user C are both "a remitter" and "a payee". For another example, the fake remitter can include a participant other than the real remitter and the real payee. For example, when the real remitter is user A, and real payees are user B and user C, irrelevant user D can be configured as the fake remitter, to hide the identity of user A. Still for another example, the fake remitter can include both the real payee and another user. For example, when the real remitter is user A, and real payees are user B and user C, user B, user C, and user D can be configured as fake remitters, to hide the identity of user A.

For the real payee and the fake payee:

In an implementation, the payees of the remittance transaction M can include only the real payee. In one case, when there is no change in the balance, the real payee include only an initial remittance object, namely, an object initially determined to execute a transaction with the real remitter. In this case, the sum of asset amounts t_j_1 to t_j_m corresponding to the to-be-spent assets ID_j_1 to ID_j_m is exactly equal to the sum of transfer amounts of initial remittance objects, in other words, there is no change in the balance. In another case, when there is change in the balance, the real payee include the real remitter and an initial remittance object. A difference between the sum of asset amounts t_j_1 to t_j_m corresponding to the to-be-spent assets ID_j_1 to ID_j_m and the sum of transfer amounts of initial remittance objects is a change amount.

In another implementation, in addition to the real payee, the payees of the remittance transaction M can include the fake payee. In one case, the fake payee can include the real remitter, but there is no change in the balance in this case. In another case, the fake payee can include a participant other than the real remitter and the real payee. By setting a transfer amount corresponding to the fake payee to 0, impact on the real payee can be avoided. In addition, transfer amounts of all the payees are corresponding homomorphic ciphertext, and therefore the identity of the real payee can be hidden by using the fake payee.

Based on an actual situation, the identity of the real remitter can be hidden by using only the fake remitter, or the identity of the real payee can be further hidden by using the fake payee. In an implementation, the participants of remittance transaction M can include the real remitter, the real payee, and a cover party distinguished from the real remitter and the real payee. These users constitute n participants in total, and the n participants are involved in remittance and collection of the remittance transaction. For the real remitter, the real payee and the cover party are fake remitters, and for the real payee, the real remitter and the cover party are fake payees, and therefore identities of both the real remitter and the real payee are hidden. In addition, each participant participates in both remittance and collection, and therefore identity confusion can be implemented between the remitter and the payee, thereby further increasing the reliability of identity hiding.

Assume that the payees of the remittance transaction M are Q_1 to Q_u, and corresponding transfer amounts are t'_1 to t'_u, where 1≤u≤n. In the remittance transaction M, similar to the asset amounts t_j_1 to t_j_m corresponding to the previous to-be-spent assets, the transfer amounts $t'\_1$ to $t'\_u$ are respectively recorded as corresponding transfer amount commitments $PC(t'\_1, r'\_1)$ to $PC(t'\_u, r'\_u)$ in the remittance transaction M, where $r'\_1$ to $r'\_u$ are random numbers. The random numbers $r'\_1$ to $r'\_u$ can be determined by the real remitter, and are notified to the corresponding payees (usually notified only to the real payee) through, for example, an offchain channel, so that the payees can perform verification based on the random numbers $r'\_1$ to $r'\_u$. For example, real payee w can verify whether $PC(t'\_w, r'\_w) = t'\_w \times G + r'\_w \times H$.

After the remittance transaction M is completed, the transfer amount is transferred to the account of each payee. In the present specification, the account model shown in FIG. 4 or FIG. 5 is used. Therefore, the transfer amount is actually transferred into the "income balance" in the corresponding account, and the income balance is increased by the corresponding transfer amount. For the fake payee, the transfer amount corresponding to the fake payee is 0, and therefore it is equivalent to that an income balance in the account corresponding to the fake payee remains unchanged. In addition, the transfer amount is added to the "income balance" part instead of the "asset" part, and therefore there is no asset whose asset amount is 0 in the account corresponding to the fake payee, thereby avoiding an increase in maintenance costs of the account.

Step 704*a*: Obtain key images $I\_1$ to $I\_m$ included in a linkable ring signature of the remittance transaction M, where values of the key images $I\_1$ to $I\_m$ are related to a private key $x\_j$ and a public key $P\_j$ of the real remitter and asset identifiers $ID\_j\_1$ to $ID\_j\_m$.

The real remitter needs to maintain a public and private key pair, such as the private key $x\_j$ and the public key $P\_j$. Before the public and private key pair is determined, a number field $Z\_q$ and an elliptic curve in the number field need to be determined, for example, elliptic curve Ed25519. It is set that G and H are two random generators of the elliptic curve, where $|G|=p$ is a large prime number (for example, is not less than a predetermined value), private key $x\_j$ of the real remitter is selected from a value range $(0, p)$, and the corresponding public key is $P\_j = x\_j \times G$. A public and private key pair uniquely corresponding to each of other participants is determined in a similar way.

The key images $I\_1$ to $I\_m$ are in a one-to-one mapping relationship with the to-be-spent assets $ID\_j\_1$ to $ID\_j\_m$ provided by the real remitter, and are respectively used to verify whether the corresponding to-be-spent assets have been spent, to alleviate a "double spending" problem. The values of the key images $I\_1$ to $I\_m$ are related to the asset identifiers $ID\_j\_1$ to $ID\_j\_m$ of the corresponding assets. Therefore, even if all the key images use the same public and private key pair (namely, the private key $x\_j$ and the public key $P\_j$ of the real remitter), it can also be ensured, based on differences between values of the asset identifiers $ID\_j\_1$ to $ID\_j\_m$, that the generated key images $I\_1$ to $I\_m$ are entirely different. Therefore, there is no need to maintain a public and private key pair for all assets, and a quantity of public and private key pairs that need to be maintained by each account can be made irrelevant to a quantity of assets included in a transaction when the "double spending" problem is alleviated. For example, $I\_d = x\_j \times Hash\_G(P\_j, ID\_j\_d)$, where $d \in [1, m]$, and $Hash\_G(\ )$ is a hash function from the elliptic curve to itself.

After receiving the remittance transaction M, the blockchain node can compare the key images $I\_1$ to $I\_m$ with a historical key image set, to determine whether the historical key image set includes historical key images that are the same as the key images $I\_1$ to $I\_m$. The historical key image set is used to store a key image corresponding to an asset that has been previously spent. If there is a historical key image that is the same as a key image in the key images $I\_1$ to $I\_m$, it indicates that an asset corresponding to the key image has been spent, in other words, a "double spending" problem occurs, and execution of the remittance transaction M should be prevented. If the key images $I\_1$ to $I\_m$ do not belong to the historical key image set, it indicates that none of the assets $ID\_j\_1$ to $ID\_j\_m$ corresponding to the key images $I\_1$ to $I\_m$ is spent, and when another transaction execution condition is satisfied, the remittance transaction M can be executed. In addition, after the remittance transaction M is completed, the assets $ID\_j\_1$ to $ID\_j\_m$ corresponding to the key images $I\_1$ to $I\_m$ are all spent, and therefore the key images $I\_1$ to $I\_m$ need to be added to the historical key image set, to subsequently detect a "double spending" problem related to the key images $I\_1$ to $I\_m$.

Step 704*b*: Verify the linkable ring signature, where the linkable ring signature is generated by the real remitter based on the private key $x\_j$ and the public key $P\_j$ held by the real remitter and a public key $P\_i$ held by the fake remitter i, and when the verification on the linkable ring signature succeeds, it is determined that inputs and outputs of the remittance transaction M are equal.

The linkable ring signature can be directly generated by the real remitter based on the private key $x\_j$ and the public key $P\_j$ corresponding to the real remitter and the public key $P\_i$ corresponding to the fake remitter i without using the following pseudo private key $r''$ and pseudo public key $P''\_j$ corresponding to the real remitter and the pseudo public key $P''\_i$ corresponding to the fake remitter i. In this case, if the verification on the linkable ring signature succeeds, it can be proved that the linkable ring signature is obtained through signature by using a public key in public keys $(P\_1, \ldots, P\_n)$, thereby completing identity verification without exposing the identity of the real remitter.

The linkable ring signature can be generated by the real remitter based on the private key $x\_j$, the public key $P\_j$, the pseudo private key $r''$, and the pseudo public key $P''\_j$ corresponding to the real remitter and the public key $P\_i$ and the pseudo public key $P''\_i$ corresponding to the fake remitter i. The pseudo public key $P''\_j = [PC(t\_j\_1, r\_j\_1) + \ldots + PC(t\_j\_m, r\_j\_m)] - [PC(t'\_1, r'\_1) + \ldots + PC(t'u, r'\_u)]$, and pseudo private key $r'' = (r\_j\_1 + \ldots + r\_j\_m) - (r'\_1 + \ldots + r'\_u)$. In addition, the real remitter can calculate a pseudo public key $P''\_i = [PC\{i, 1\} + \ldots + PC\{i, m\}] - [PC(t'\_1, r'\_1) + \ldots + PC(t'\_u, r'\_u)]$ corresponding to a cover party i based on the assets $[ID\_i\_1, PC\{i, 1\}]$ to $[ID\_i\_m, PC\{i, m\}]$ held by the fake remitter i, where $i \in [1, j-1] \cup [j+1, n]$. For the generation process of the linkable ring signature, references can be made to the implementation shown in FIG. 6. Details are omitted here for simplicity. The blockchain node verifies the linkable ring signature, to efficiently and compactly implement the following two verification functions. The pseudo public key $P''\_j$ and the pseudo private key $r''$ satisfy $P''\_j = r'' \times G$, and the pseudo public key $P''\_i$ and the pseudo private key $r''$ satisfy $P''\_i \neq r'' \times G$, and therefore when the linkable ring signature is generated based on the pseudo private key $r''$ and the pseudo public keys $P''\_j$ and $P''\_i$, if the verification on the linkable ring signature succeeds, it can be proved that there is a pseudo public key whose value is equal to $r'' \times G$ in pseudo public keys $(P''\_1, \ldots, P''\_n)$, and the pseudo public key corresponds to $t''=0$, so that the inputs and outputs of the remittance transaction M are equal. In addition, when the linkable ring signature is generated based on the private key $x\_j$ and the public key $P\_j$ corresponding to the real remitter and the public key $P\_i$ corresponding to the fake remitter i, if the verification on the linkable ring signature succeeds, it can be proved that the linkable ring signature is obtained through signature by using a private key corresponding to a public key in public keys ($P\_1, \ldots, P\_n$), thereby completing identity verification without exposing the identity of the real remitter.

Step 706: Execute the remittance transaction M when a transaction execution condition is satisfied, so that an income balance in the account corresponding to each payee is increased by the corresponding transfer amount, where the transaction execution condition includes: the key images $I\_1$ to $I\_m$ do not belong to the historical key image set, and the verification on the linkable ring signature succeeds, the key images $I\_1$ to $I\_m$ are added to the historical key image set after the transaction is completed, and the to-be-spent assets $ID\_j\_1$ to $ID\_j\_m$ are maintained and recorded as assets in the account corresponding to the real remitter in the blockchain ledger.

In an account model used, for example, by Ethereum, after a remitter has spent an amount of money by using a transaction, an account balance in a corresponding account is updated immediately, that is, the amount of spent money is deducted, to ensure accuracy of the account balance. However, in the technical solution of the present specification, after the remittance transaction M is completed, although the assets $ID\_j\_1$ to $ID\_j\_m$ in the account corresponding to the real remitter are spent, the account corresponding to the real remitter is not immediately updated, that is, there is no need to immediately delete the assets $ID\_j\_1$ to $ID\_j\_m$ in the account corresponding to the real remitter, so that when any user queries the account corresponding to the real remitter by using the blockchain ledger, no asset change is detected after the remittance transaction M is completed, to avoid exposing, based on the asset change, the real identity assumed by the real remitter in the remittance transaction M. In addition, although the account corresponding to the real remitter includes both spent and unspent assets, based on maintenance of the historical key image set, it can be ensured that the real remitter can actually spend only the unspent asset and a "double spending" operation performed by the real remitter on the spent asset can be accurately detected.

Certainly, to avoid an increase that is in costs of maintenance by the blockchain node and caused by excessive accumulation of assets in an account and to facilitate management of assets in an account of each user by the user, the user can clear spent assets in the account of the user. The real remitter is used as an example. The real remitter can initiate an asset deletion request to a blockchain network, to delete at least some of assets that have been spent by the real remitter from the blockchain ledger. For example, the real remitter can specify an asset identifier corresponding to an asset that needs to be deleted. Alternatively, the real remitter can specify a time period (can specify two endpoints of the time period, where if only the left endpoint is specified, the time period is from a moment corresponding to the left endpoint to the current moment; or if only the right endpoint is specified, the time period is from a moment at which the account is created to a moment corresponding to the right endpoint), and all assets generated or spent in the time period are deleted.

The linkable ring signature can further include a key image $I\_(m+1)$. The key image is generated by the real remitter based on the pseudo private key $r''$ and the pseudo public key $P''\_j$ corresponding to the real remitter and the pseudo public key $P''\_i$ corresponding to the fake remitter i.

For example, $I\_(m+1)=r'' \times Hash\_G(P''\_j)$. As described above, there is a one-to-one mapping relationship between the key image $I\_(m+1)$ and a corresponding transaction. In this case, the key image $I\_(m+1)$ is compared with a historical key image, to identify a replay problem for the remittance transaction M. If the key image $I\_(m+1)$ has the same historical key image, it indicates that the remittance transaction M is replayed. Therefore, the transaction execution condition can further include: the key image $I\_(m+1)$ does not belong to the historical key image set.

When the real remitter corresponds to the public key $P\_j$ and the fake remitter i corresponds to the public key $P\_i$, the transaction execution condition can further include: an asset $ID\_k\_d$ belongs to an owner of a public key $P\_k$, where $k-[1, n]$, and $d \in [1, m]$. In other words, the blockchain node can verify ownership of each asset.

In a confidential transaction, the blockchain node can further verify whether each of the transfer amounts $t'\_1$ to $t'\_u$ in the remittance transaction M is not less than 0. Transfer amount commitments $PC(t'\_1, r'\_1)$ to $PC(t'\_u, r'\_u)$ are generated by the real remitter based on the transfer amounts $t'\_1$ to $t'\_u$ and random numbers $r'\_1$ to $r'\_u$, and the transfer amounts $t'\_1$ to $t'\_u$ and the random numbers $r'\_1$ to $r'\_u$ are held only by the real remitter and payees $Q\_1$ to $Q\_u$. Therefore, a verifier needs to perform a verification operation by using range proofs $RP\_1$ to $RP\_u$ included in the remittance transaction M, to determine whether the transfer amounts $t'\_1$ to $t'\_u$ satisfy $t'\_1 \geq 0$ to $t'\_u \geq 0$. The range proofs $RP\_1$ to $RP\_u$ are generated by the real remitter and are added to the remittance transaction M. Therefore, the transaction execution condition can further include: each of the transfer amounts is not less than 0.

Figure 8:
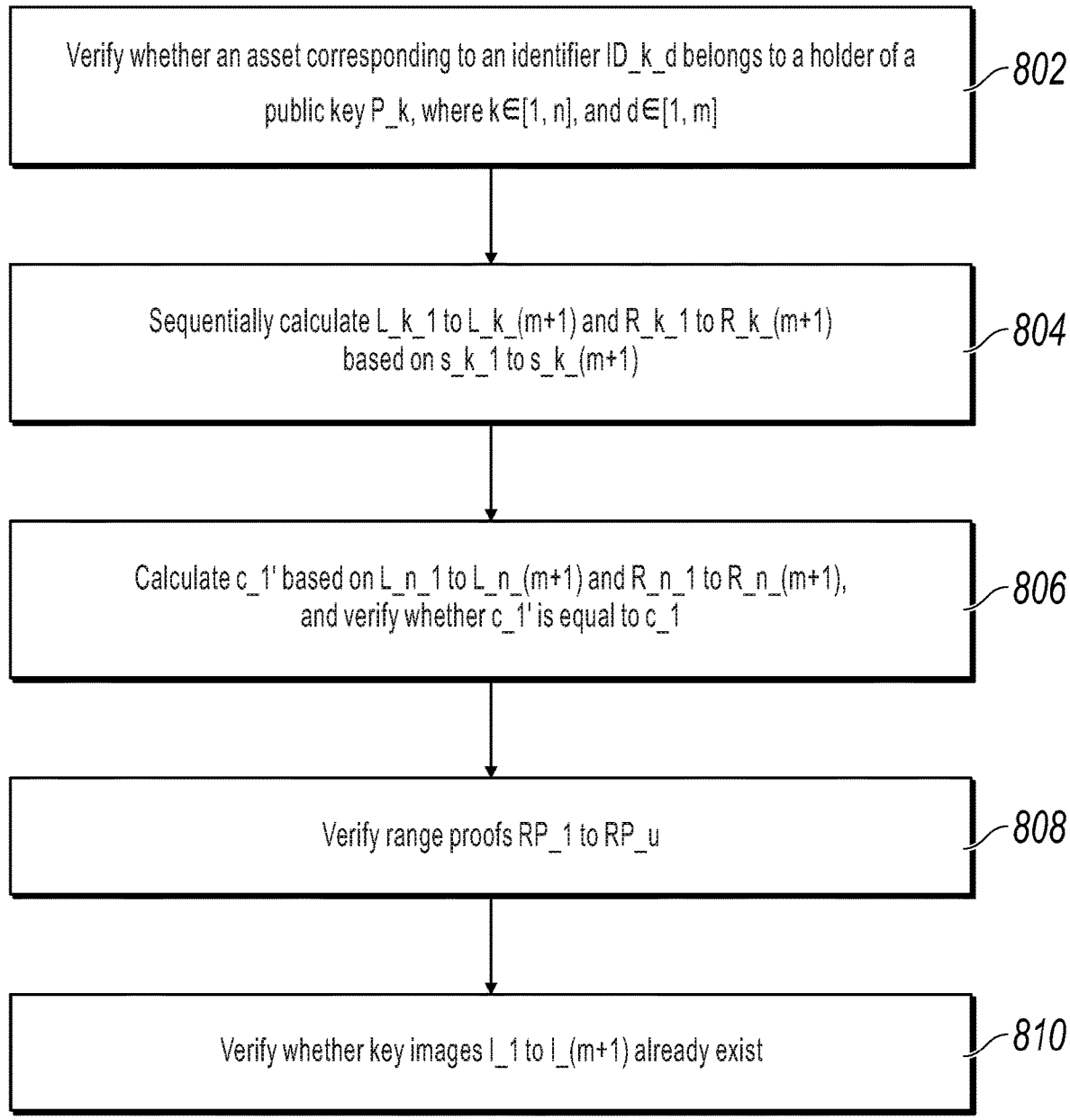
FIG. 8 is a flowchart illustrating verifying a linkable ring signature, according to an example implementation.

With reference to FIG. 8, the following describes the process of verifying the linkable ring signature in step 704b. FIG. 8 is a flowchart illustrating verifying a linkable ring signature, according to an example implementation. As shown in FIG. 8, the following steps can be included.

Step 802: Verify whether an asset corresponding to the identifier $ID\_k\_d$ belongs to a holder of the public key $P\_k$, where $k \in [1, n]$, and $d \in [1, m]$.

The verifier can be a blockchain node in the blockchain network. After receiving the remittance transaction M submitted by the real remitter, the blockchain node can verify the ring signature of the remittance transaction M. Similarly, each blockchain node receives the remittance transaction M, and performs verification as a verifier. The remittance transaction M can be sent by a client device to the verifier, or the remittance transaction M can be forwarded to another verifier by a verifier after receiving the remittance transaction M from a client device, or the remittance transaction M can be forwarded to another verifier by a verifier after receiving the remittance transaction M from another verifier.

As a blockchain node, the verifier maintains the full blockchain ledger, and therefore the verifier can learn of an asset holding status of each user. The remittance transaction M involves the asset $ID\_k\_d$ held by user k (corresponding to the public key $P\_k$). In this case, the verifier can verify, based on the maintained asset holding status, whether a mapping relationship between each public key $P\_k$ and a corresponding asset $ID\_k\_d$ holds true, that is, whether the holder of the public key $P\_k$ has m assets corresponding to the identifier $ID\_k\_d$. If the mapping relationship between each public key $P\_k$ and the identifier $ID\_k\_d$ holds true, subsequent steps can be performed. If an asset corresponding to an identifier does not belong to the holder of the public key P_k, the verifier can determine that the remittance transaction M is invalid, and there is no need to perform subsequent steps 804 to 808.

Step 804: Sequentially calculate L_k_1 to L_k_(m+1) and R_k_1 to R_k_(m+1) based on s_k_1 to s_k_(m+1).

Step 806: Calculate c_1' based on L_n_1 to L_n_(m+1) and R_n_1 to R_n_(m+1), and verify whether c_1' is equal to c_1.

The verifier can calculate intermediate parameters L_j_d, R_j_d, L_j_(m+1), R_j_(m+1), L_i_d, R_i_d, L_i_(m+1), and R_i_(m+1) based on random numbers and/or its derived values included in the ring signature, to verify whether the intermediate parameters L_j_d and L_i_d satisfy a ring value rule, whether the intermediate parameters R_j_d and R_i_d satisfy the ring value rule, whether the intermediate parameters L_j_(m+1) and L_i_(m+1) satisfy the ring value rule, and whether the intermediate parameters R_j_(m+1) and R_i_(m+1) satisfy the ring value rule.

For example, when the random numbers and/or its derived values included in the ring signature include s_1_1 to s_1_(m+1), ..., s_n_1 to s_n_(m+1), and c_1, the ring value rule between the intermediate parameters L_j_d and L_i_d can include: $L\_k\_d = (s\_k\_d \times G + c\_k \times P\_k) \mod p$, where $h \in [1, n]$; and $$c\_k = \begin{cases} \text{Hash}[M, L\_n\_1, R\_n\_1, \ldots, L\_n\_(m+1), R\_n\_(m+1)], k = 1 \\ \text{Hash}[M, L\_(j-1)\_1, R\_(j-1)\_1, \ldots, L\_(j-1)\_(m+1), \\ \qquad R\_(j-1)\_(m+1)], k \in [2, n]. \end{cases}$$

The ring value rule between the intermediate parameters L_j_(m+1) and L_i_(m+1) includes:

$L\_k\_(m+1) = [s\_k\_(m+1) \times G + c\_k \times P''\_k] \mod p$.

The ring value rule between the intermediate parameters R_j_d and R_i_d includes:

$R\_k\_d = [s\_k\_d \times \text{Hash}\_G(P\_k, ID\_k\_d) + c\_k \times I\_d] \mod p$.

The ring value rule between the intermediate parameters R_j_(m+1) and R_i_(m+1) includes:

$R\_k\_(m+1) = [s\_k\_(m+1) \text{Hash}\_G(P''\_k) + c\_k \times I\_(m+1)] \mod p$.

Therefore, the verifier can first generate L_1_d, namely, L_1_1 to L_1_m, based on s_1_d, c_1, G, P_1, and p, and generate R_1_d, namely, R_1_1 to R_1_m, based on s_1_d, c_1, P_1, ID_1_d, I_d, and p. In addition, the verifier generates L_1_(m+1) based on s_1_(m+1), c_1, G, P''_1, and p, and generates R_1_(m+1) based on s_1_(m+1), c_1, P''_1, I_(m+1), and p.

Then, the verifier can generate c_2 based on M, L_1_d, R_1_d, L_1_(m+1), and R_1_(m+1), generate L_2_d based on s_2_d, c_2, G, P_2, and p, generate R_2_d based on s_2_d, c_2, P_2, ID_2_d, I_d, and p, generate L_2_(m+1) based on s_2_(m+1), c_2, G, P''_2, and p, generate R_2_(m+1) based on s_2_(m+1), c_2, P''_2, I_(m+1), and p, and by analog, until the verifier generates c_n based on M, L_(n−1)_d, R(n−1)_d, L_(n−1)_(m+1), and R(n−1)_(m+1), generates L_n_d based on s_n_d, c_n, G, P_n, and p, generates R_n_d based on s_n_d, c_n, P_n, ID_n_d, I_d, and p, generates L_n_(m+1) based on s_n_(m+1), c_n, G, P''_n, and p, and generates R_n_(m+1) based on s_n_(m+1), c_n, P''_n, I_(m+1), and p.

Further, the verifier can calculate c_1'=Hash[M, L_n_1, R_n_1, ..., L_n_(m+1), R_n_(m+1)] based on the previous calculation equation of c_k. The reason for using c_1' here is to distinguish from c_1 included in the ring signature. In this case, the verifier can compare c_1' with c_1 included in the ring signature. If c_1' is equal to c_1, it indicates that the ring value rule is satisfied, and it can be determined that (1) there is a pseudo public key that enables a collected amount of the remittance transaction M to be equal to a remitted amount of the remittance transaction M in pseudo public keys P_1 to P_n and (2) the ring signature is generated by using a private key corresponding to a public key in public keys P_1 to P_m. If c_1' is not equal to c_1, it indicates that at least one of (1) and (2) is does not hold true, the remittance transaction M is determined as invalid, and there is no need to perform the following step 808.

Step 808: Verify range proofs RP_1 to RP_u.

The verifier obtains the range proofs RP_1 to RP_u from transaction content of the remittance transaction M, and verifies the range proofs RP_1 to RP_u, to determine whether each of the corresponding transfer amounts t'_1 to t'_u is not less than 0. If each of the corresponding transfer amounts t'_1 to t'_u is not less than 0, step 810 is performed. Otherwise, the remittance transaction M is determined as invalid, and there is no need to perform the following step 810.

Step 810: Verify whether key images I_1 to I_(m+1) already exist.

In an implementation, the verifier can compare the key images I_1 to I_(m+1) with historical key images, to determine whether the key images I_1 to I_(m+1) already exist. If any one of the key images I_1 to I_(m+1) has a corresponding historical key image, it can be determined that the remittance transaction M is invalid. If none of the key images I_1 to I_(m+1) has a corresponding historical key image, it can be determined that the remittance transaction M is valid, and the remittance transaction M can be executed to complete a remittance operation.

Figure 9:
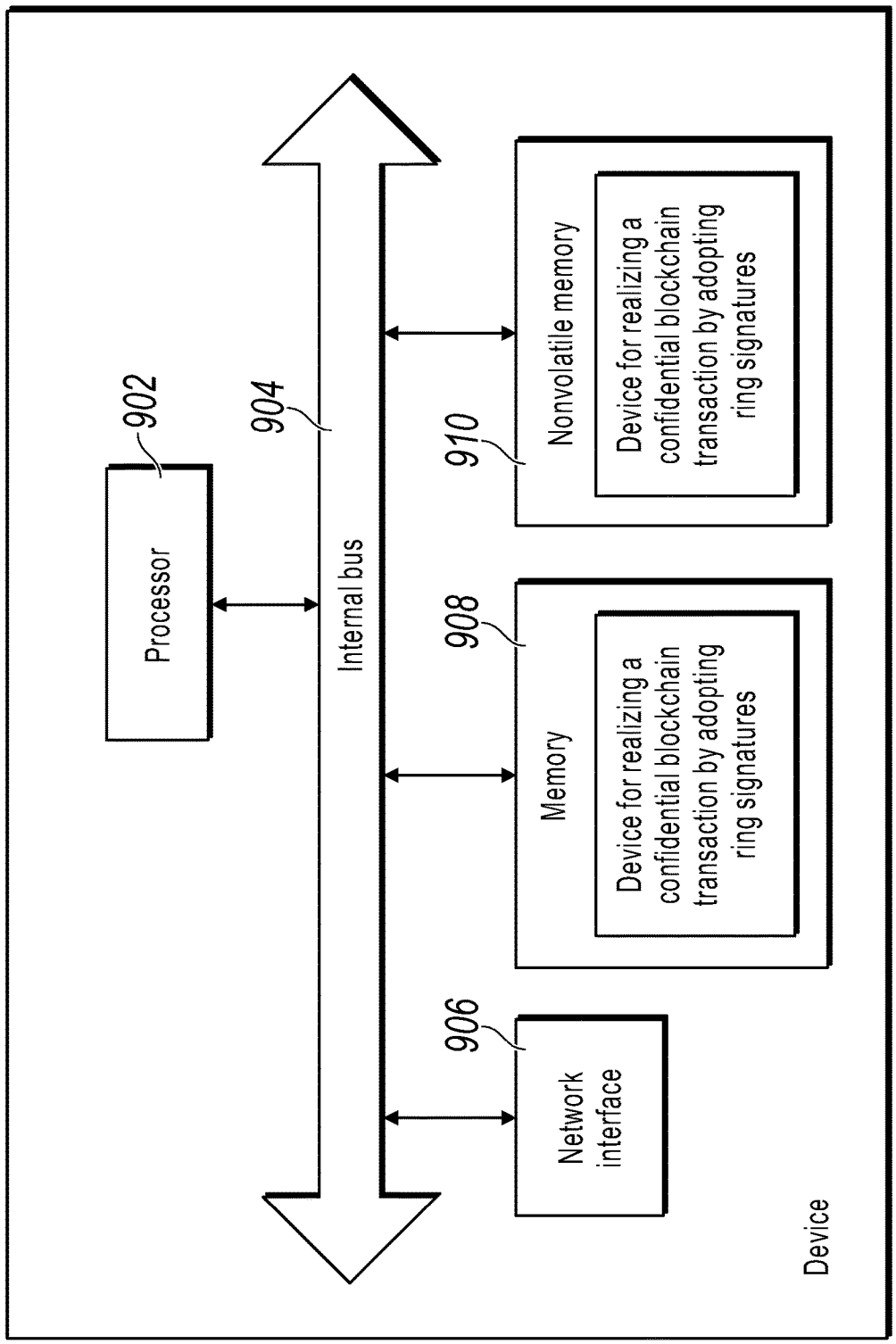
FIG. 9 is a schematic structural diagram of a device, according to an example implementation.

FIG. 9 is a schematic structural diagram of a device, according to an example implementation. Referring to FIG. 9, in terms of hardware, the device includes a processor 902, an internal bus 904, a network interface 906, a memory 908, and a nonvolatile memory 910, and certainly can further include hardware needed by other services. The processor 902 reads a corresponding computer program from the nonvolatile memory 910, and then runs the corresponding computer program in the memory 908, to logically form a device for realizing a confidential blockchain transaction by adopting ring signatures. Certainly, in addition to a software implementation, one or more implementations of the present specification do not exclude another implementation, for example, a logic device or a combination of hardware and software. That is, an execution body of the following processing procedure is not limited to each logic unit, and can be hardware or a logic device.

Figure 10:
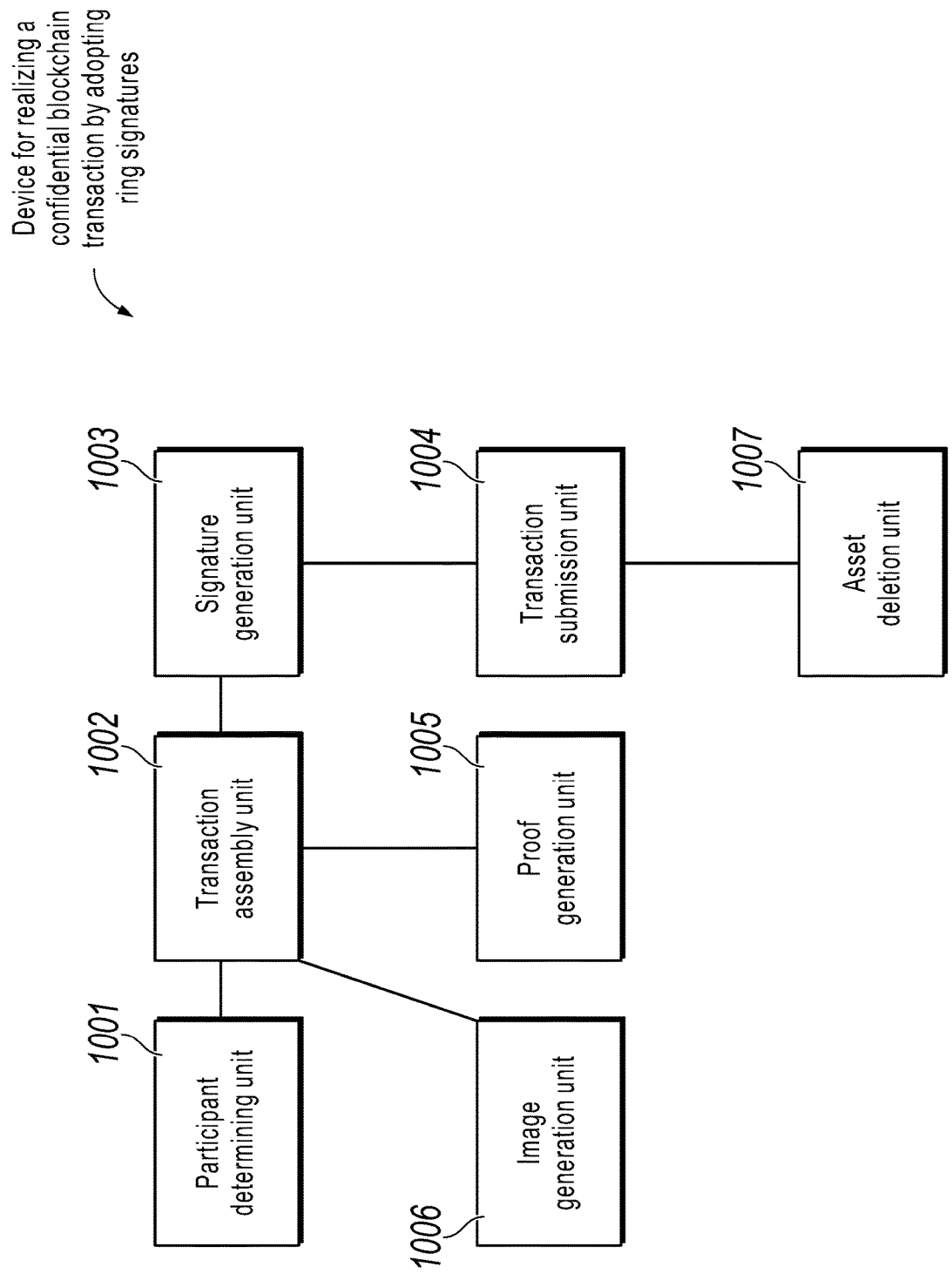
FIG. 10 is a block diagram illustrating a device for realizing a confidential blockchain transaction by adopting ring signatures, according to an example implementation.

Referring to FIG. 10, in a software implementation, the device for realizing a confidential blockchain transaction by adopting ring signatures can include the following: a participant determining unit 1001, configured to determine all participants of a remittance transaction M, where each participant has a corresponding account in a blockchain ledger, and the account includes an income balance whose value is recorded as a corresponding commitment value and several assets whose asset amounts are recorded as asset commitments; a transaction assembly unit 1002, configured to assemble the remittance transaction M based on to-be-spent assets ID_j_1 to ID_j_m in an account corresponding to a real remitter in the participants, covered assets ID_i_1 to ID_i_m in an account corresponding to a fake remitter i, and a commitment value of a transfer amount corresponding to each payee in the participants; a signature generation unit 1003, configured to generate a linkable ring signature for the remittance transaction M based on a private key $x\_j$ and a public key $P\_j$ held by the real remitter and a public key $P\_i$ held by the fake remitter i, where the linkable ring signature includes key images $I\_1$ to $I\_m$, and values of the key images $I\_1$ to $I\_m$ are related to the private key $x\_j$ and the public key $P\_j$ of the real remitter and asset identifiers $ID\_j\_1$ to $ID\_j\_m$; and a transaction submission unit 1004, configured to submit the signed remittance transaction M to a blockchain network, where after the transaction is completed, an income balance in an account corresponding to each payee is increased by the corresponding transfer amount, the key images $I\_1$ to $I\_m$ are added to a historical key image set, and the to-be-spent assets $ID\_j\_1$ to $ID\_j\_m$ are maintained and recorded as assets in the account corresponding to the real remitter in the blockchain ledger.

Optionally, the fake remitter includes a participant other than the real remitter and a real payee, or the fake remitter includes a participant other than the real remitter.

Optionally, the payees include a real payee and a fake payee, and a transfer amount corresponding to the fake payee is 0.

Optionally, when there is no change in the balance, the real payee include an initial remittance object, or when there is change in the balance, the real payee include an initial remittance object and the real remitter, and the fake payee include a participant other than the real payee.

Optionally, assets in the account corresponding to the participant include assets generated by allocating at least a part of the income balance in the corresponding account; or the account corresponding to the participant further includes a primary balance, the primary balance is recorded as a corresponding commitment value in the blockchain ledger, and assets in the account corresponding to the participant include assets generated by allocating at least a part of the primary balance in the corresponding account.

Optionally, when the account corresponding to the participant includes the primary balance, the income balance in the corresponding account is further combined into the primary balance in the corresponding account under an instruction of a combination command.

Optionally, the key images $I\_1$ to $I\_m$ are calculated by using the following equation:

$$I\_d = x\_j \times \text{Hash\_G}(P\_j, ID\_j\_d), d \in [1, m], \text{ where}$$

Hash_G( ) is a hash function from an elliptic curve to itself.

Optionally, the device further includes the following: a proof generation unit 1005, configured to generate a corresponding range proof for the transfer amount corresponding to each payee of the remittance transaction M, where the range proof is assembled into the remittance transaction M, and is used to prove that the corresponding transfer amount is not less than 0.

Optionally, the signature generation unit 1003 is specifically configured to: determine a pseudo public key $P'''\_j = [PC(t\_j\_1, r\_j\_1) + \ldots + PC(t\_j\_m, r\_j\_m)] - [PC(t'\_1, r'\_1) + \ldots + PC(t'u, r'\_u)]$ corresponding to the real remitter and a pseudo private key $r'' = (r\_j\_1 + \ldots + r\_j\_m) - (r'\_1 + \ldots + r'\_u)$ corresponding to the real remitter based on asset amounts $t\_j\_1$ to $t\_j\_m$ corresponding to the to-be-spent assets $ID\_j\_1$ to $ID\_j\_m$, random numbers $r\_j\_1$ to $r\_j\_m$, asset commitments $PC(t\_j\_1, r\_j\_1)$ to $PC(t\_j\_m, r\_j\_m)$, transfer amounts $t'\_1$ to $t'\_u$ corresponding to payees $Q\_1$ to $Q\_u$, random numbers $r'\_1$ to $r'\_u$, and transfer amount commitments $PC(t'\_1, r'\_1)$ to $PC(t'u, r'\_u)$, where $u \geq 1$; determine a pseudo public key $P'''\_i = [PC\{i, 1+ \ldots + PC, m\}] - [PC(t'\_1, r'\_) + \ldots + PC(t'\_u, r'u)]$ corresponding to the fake remitter i based on the asset commitments $PC\{i, 1\}$ to $PC\{i, m\}$ corresponding to the covered assets $ID\_i\_1$ to $ID\_i\_m$, where $i \in [1, j-1] \cup [j+1, n]$; and generate the linkable ring signature for the remittance transaction M based on the private key $x\_j$, the public key $P\_j$, the pseudo private key $r''$, and the pseudo public key $P'''\_j$ corresponding to the real remitter and the public key $P\_i$ and the pseudo public key $P'''\_i$ corresponding to the fake remitter i.

Optionally, the device further includes the following: an image generation unit 1006, configured to generate a key image $I\_(m+1) = r'' \times \text{Hash\_G}(P'''\_j)$ based on the pseudo private key $r''$ and the pseudo public key $P'''\_j$ corresponding to the real remitter, where the linkable ring signature further includes the key image $I\_(m+1)$.

Optionally, the signature generation unit 1003 is specifically configured to: generate intermediate parameters $L\_j\_d$, $R\_j\_d$, $L\_j\_(m+1)$, and $R\_j\_(m+1)$ corresponding to the real remitter and intermediate parameters $L\_i\_d$, $R\_i\_d$, $L\_i\_(m+1)$, and $R\_i\_(m+1)$ corresponding to the fake remitter i, where $d \in [1, m]$, the intermediate parameters $L\_j\_d$ and $L\_i\_d$ satisfy a ring value rule, the intermediate parameters $L\_j\_(m+1)$ and $L\_i\_(m+1)$ satisfy the ring value rule, the intermediate parameters $R\_j\_d$ and $R\_i\_d$ satisfy the ring value rule, the intermediate parameters $R\_j\_(m+1)$ and $R\_i\_(m+1)$ satisfy the ring value rule, and values of the intermediate parameters $L\_j\_d$, $R\_j\_d$, $L\_j\_(m+1)$, $R\_j\_(m+1)$, $L\_i\_d$, $R\_i\_d$, $L\_i\_(m+1)$, and $R\_i\_(m+1)$ are related to at least one selected random number and/or its derived value; and generate the linkable ring signature for remittance transaction M based on the selected random number and/or its derived value.

Optionally, $P\_j = x\_j \times G$, G is a base point of an elliptic curve, $|G| = p$, p is a prime number, and $0 < x\_j < p$; the generating intermediate parameters $L\_j\_d$ and $R\_j\_d$ corresponding to the real remitter includes: calculating the intermediate parameters $L\_j\_d$ and $R\_j$ based on a random number $a\_d$ selected from a number field $Z\_q$ in which the elliptic curve is located, so that $L\_j\_d = a\_d \times G$ and $R\_j\_d = a\_d \times \text{Hash\_G}(P\_j, ID\_j\_d)$, where Hash_G( ) is a hash function from the elliptic curve to itself;

the generating intermediate parameters $L\_j\_(m+1)$ and $R\_j\_(m+1)$ corresponding to the real remitter includes: calculating the intermediate parameters $L\_j\_(m+1)$ and $R\_j\_(m+1)$ based on a random number $a\_(m+1)$ selected from the number field $Z\_q$ in which the elliptic curve is located, so that $L\_j\_(m+1) = a\_(m+1) \times G$ and $R\_j\_(m+1) = a\_(m+1) \times \text{Hash\_G}(P'''\_j)$; the generating intermediate parameters $L\_i\_d$, $R\_i\_d$, $L\_i\_(m+1)$, and $R\_i\_(m+1)$ corresponding to the fake remitter i includes: generating the intermediate parameters $L\_i\_d$, $R\_i\_d$, $L\_i\_(m+1)$, and $R\_i\_(m+1)$ based on the values of $L\_j\_d$ and $R\_j\_d$, so that $L\_i\_d = (s\_i\_d \times G + c\_i \times Pi) \mod p$, $R\_i\_d = (s\_i\_d \times \text{Hash\_G}(P\_i, ID\_i\_d) + c\_i \times I\_d) \mod p$, $L\_i\_(m+1) = [s\_i\_(m+1) \times G + c\_i \times P'''\_i] \mod p$, and $R\_i\_(m+1) = [s\_i\_(m+1) \times \text{Hash\_G}(P'''\_i) + c\_i \times I\_(m+1)] \mod p$, where $I\_d = x\_j \times \text{Hash\_G}(P\_j, ID\_j\_d)$, $I\_(m+1) = r'' \times \text{Hash\_G}(P'''\_j)$, si 1l to $s\_i\_(m+1)$ are random numbers in number field $Z\_q$, when $i = 1$, $c\_1 = \text{Hash}(M, L\_n\_1, R\_n\_1, \ldots, L\_n\_(m+1), R\_n\_(m+1))$, when $i \in [2, j-1] \cup [j+1, n]$, $c\_i = \text{Hash}(M, L\_(i-1)\_1, R(i-1)\_1, \ldots, L\_(i-1)\_(m+1), R\_(i-1)\_(m+1))$, and Hash( ) is a hash function from the elliptic curve to number field $Z\_q$; and the selected random number and/or its derived value include/includes random numbers $s\_i\_1$ to $s\_i\_(m+1)$, a derived value $c\_1$, and derived values $s\_j\_1$ to $s\_j\_(m+1)$, where $s\_j\_d = (a\_d - c\_j \times x\_j) \mod p$, $s\_j\_(m+1) = [a\_(m+1) - c\_j \times r''] \mod p$, when it is determined that a value of j is 1, $c\_j=\text{Hash}(M, L\_n\_1, R\_n\_1, \ldots, L\_n\_(m+1), R\_n\_(m+1))$, and when it is determined that the value of j belongs to [2, n], $c\_j=\text{Hash}(M, L\_(j-1)\_1, R\_(j-1)\_1, \ldots L\_(j-1)\_(m+1), R\_(j-1)\_(m+1))$.

Optionally, the device further includes the following: an asset deletion unit 1007, configured to initiate an asset deletion request to the blockchain network, to delete at least some of spent assets in the account corresponding to the real remitter from the blockchain ledger.

Figure 11:
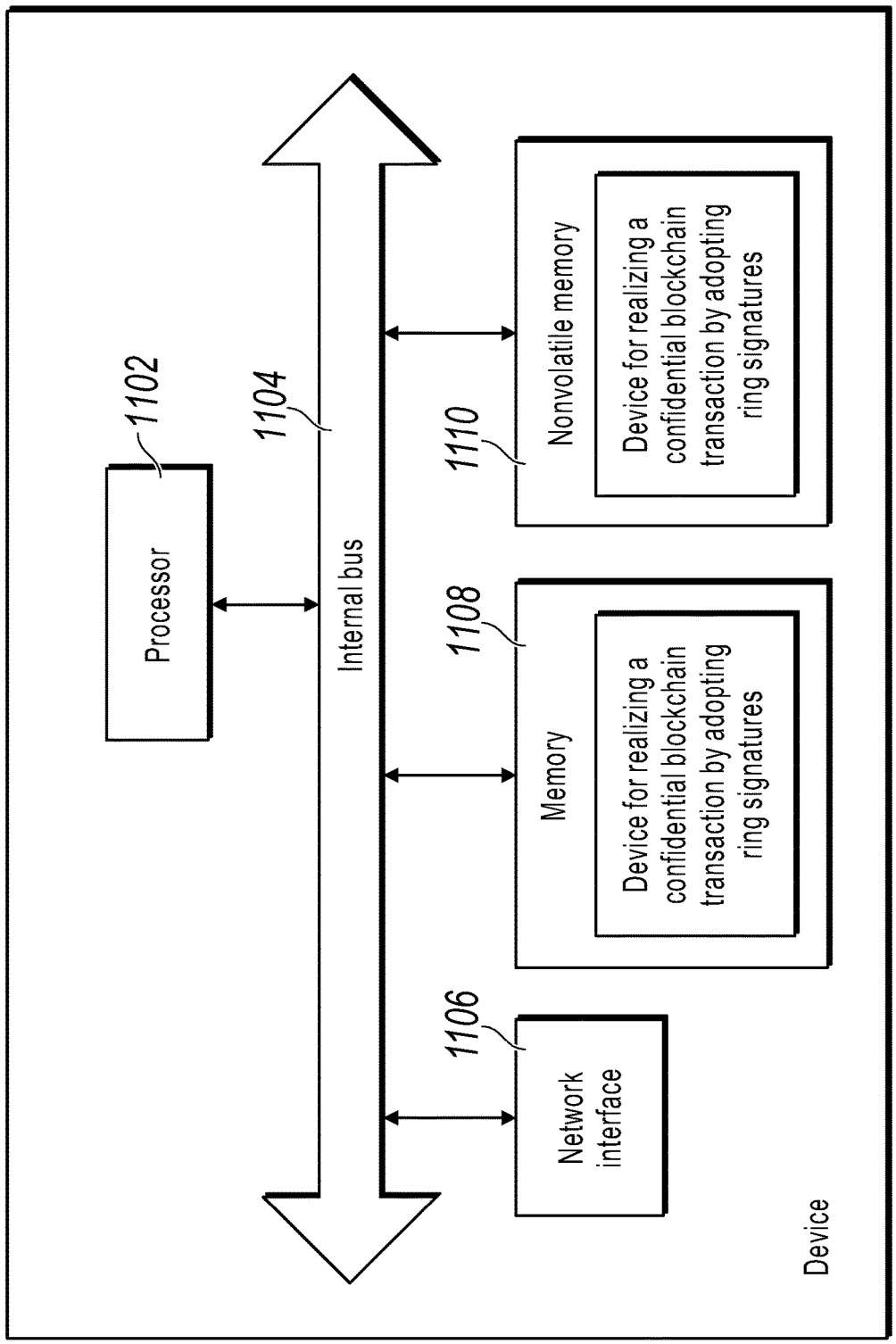
FIG. 11 is a schematic structural diagram of another device, according to an example implementation.

FIG. 11 is a schematic structural diagram of a device, according to an example implementation. Referring to FIG. 11, in terms of hardware, the device includes a processor 1102, an internal bus 1104, a network interface 1106, a memory 1108, and a nonvolatile memory 1110, and certainly can further include hardware needed by other services. The processor 1102 reads a corresponding computer program from the nonvolatile memory 1110, and then runs the corresponding computer program in the memory 1108, to logically form a device for realizing a confidential blockchain transaction by adopting ring signatures. Certainly, in addition to a software implementation, one or more implementations of the present specification do not exclude another implementation, for example, a logic device or a combination of hardware and software. That is, an execution body of the following processing procedure is not limited to each logic unit, and can be hardware or a logic device.

Figure 12:
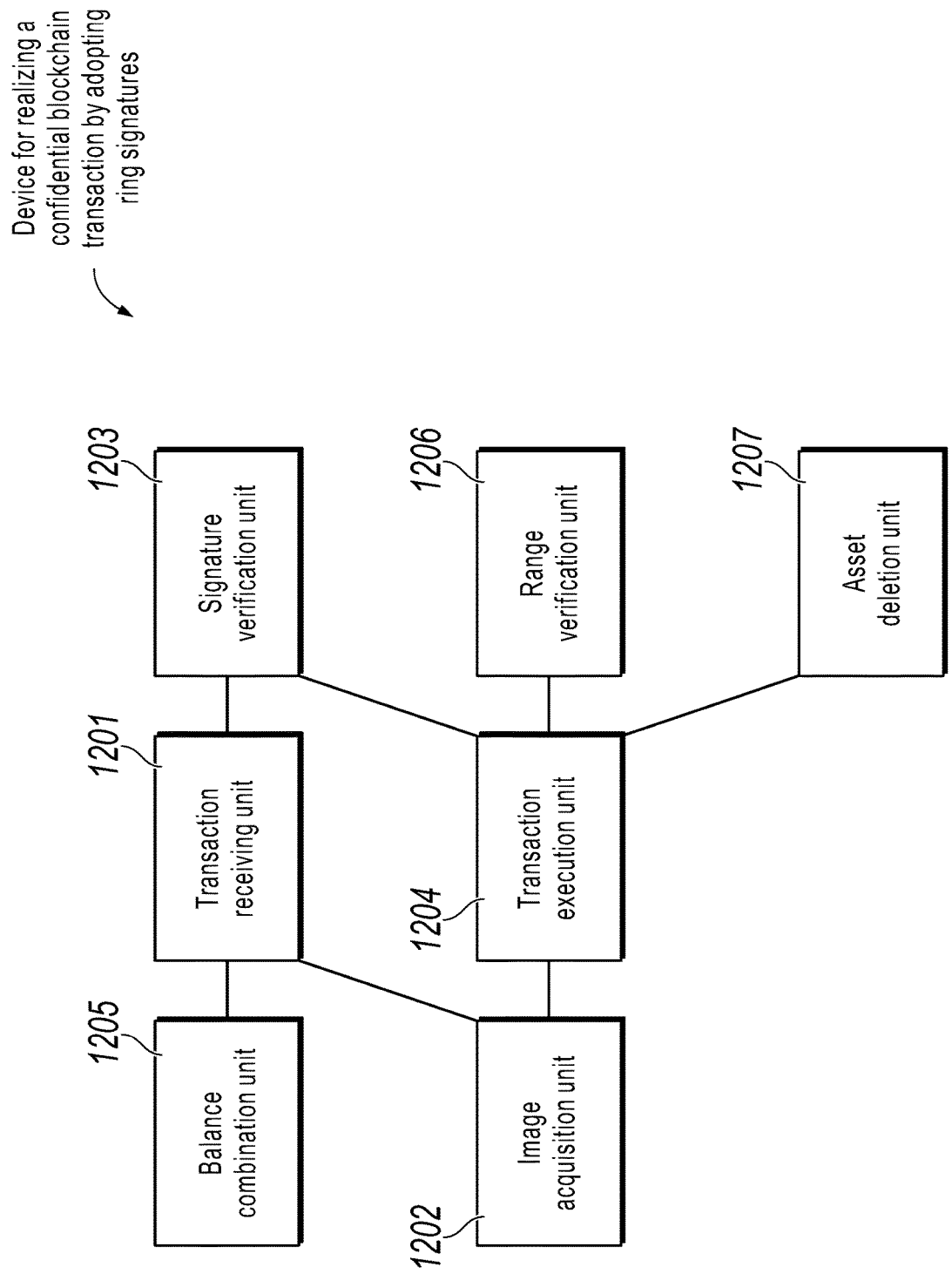
FIG. 12 is a block diagram illustrating another device for realizing a confidential blockchain transaction by adopting ring signatures, according to an example implementation.

Referring to FIG. 12, in a software implementation, the device for realizing a confidential blockchain transaction by adopting ring signatures can include the following: a transaction receiving unit 1201, configured to receive a remittance transaction M, where each participant of the remittance transaction M has a corresponding account in a blockchain ledger, the account includes an income balance whose value is recorded as a corresponding commitment value and several assets whose asset amounts are recorded as asset commitments, and the remittance transaction M is generated by a real remitter in the participants through assembly based on to-be-spent assets $ID\_j\_1$ to $ID\_j\_m$ in an account corresponding to the real remitter, covered assets $ID\_i\_1$ to $ID\_i\_m$ in an account corresponding to a fake remitter i, and a commitment value of a transfer amount corresponding to each payee in the participants; an image acquisition unit 1202, configured to obtain key images $I\_1$ to $I\_m$ included in a linkable ring signature of the remittance transaction M, where values of the key images $I\_1$ to $I\_m$ are related to a private key $x\_j$ and a public key $P\_j$ of the real remitter and asset identifiers $ID\_j\_1$ to $ID\_j\_m$; a signature verification unit 1203, configured to verify the linkable ring signature, where the linkable ring signature is generated by the real remitter based on the private key $x\_j$ and the public key $P\_j$ held by the real remitter and a public key $P\_i$ held by the fake remitter i, and when the verification on the linkable ring signature succeeds, it is determined that inputs and outputs of the remittance transaction M are equal; and a transaction execution unit 1204, configured to execute the remittance transaction M when a transaction execution condition is satisfied, so that an income balance in an account corresponding to each payee is increased by the corresponding transfer amount, where the transaction execution condition includes: the key images $I\_1$ to $I\_m$ do not belong to a historical key image set, and the verification on the linkable ring signature succeeds, the key images $I\_1$ to $I\_m$ are added to the historical key image set after the transaction is completed, and the to-be-spent assets $ID\_j\_1$ to $ID\_j\_m$ are maintained and recorded as assets in the account corresponding to the real remitter in the blockchain ledger.

Optionally, the fake remitter includes a participant other than the real remitter and a real payee, or the fake remitter includes a participant other than the real remitter.

Optionally, the payees include a real payee and a fake payee, and a transfer amount corresponding to the fake payee is 0.

Optionally, when there is no change in the balance, the real payee include an initial remittance object, or when there is change in the balance, the real payee include an initial remittance object and the real remitter, and the fake payee include a participant other than the real payee.

Optionally, assets in the account corresponding to the participant include assets generated by allocating at least a part of the income balance in the corresponding account; or the account corresponding to the participant further includes a primary balance, the primary balance is recorded as a corresponding commitment value in the blockchain ledger, and assets in the account corresponding to the participant include assets generated by allocating at least a part of the primary balance in the corresponding account.

Optionally, the device further includes the following: a balance combination unit 1205, configured to combine, when the account corresponding to the participant includes the primary balance, the income balance in the corresponding account into the primary balance in the corresponding account based on a combination command sent by the participant.

Optionally, the key images $I\_1$ to $I\_m$ are calculated by the remitter by using the following equation: $I\_d = x\_j \times \text{Hash\_G}(P\_j, ID\_j\_d)$, $d \in [1, m]$, where $\text{Hash\_G}(\ )$ is a hash function from an elliptic curve to itself.

Optionally, the device further includes the following: a range verification unit 1206, configured to verify whether the transfer amount corresponding to each payee is not less than 0 based on range proofs included in the remittance transaction M; and the transaction execution condition further includes: the transfer amount corresponding to each payee is not less than 0.

Optionally, the transaction execution condition further includes: an asset $ID\_k\_d$ belongs to an owner of a public key $P\_k$, where $k \in [1, n]$, $d \in [1, m]$, and $i \in [1, j-1] \cup [j+1, n]$.

Optionally, the linkable ring signature is generated by the real remitter based on the private key $x\_j$, the public key $P\_j$, a pseudo private key $r''$, and a pseudo public key $P''\_j$ corresponding to the real remitter and the public key $P\_i$ and a pseudo public key $P''\_i$ corresponding to the fake remitter i, the pseudo public key $P''\_j=[PC(t\_j\_1, r\_j\_1)+\ldots+PC(t\_j\_m, r\_j\_m)]-[PC(t'\_1, r'\_1)+\ldots+PC(t'u, r'\_u)]$, pseudo private key $r''=(r\_j\_1+\ldots+r\_j\_m)-(r'\_1+\ldots+r'u)$, and the pseudo public key $P''\_i=[PC\{i, 1\}+\ldots+PC\{i, m\}]-[PC(t'\_1, r'\_1)+\ldots+PC(t'u, r'\_u)]$, where $i \in [1, j-1] \cup [j+1, n]$; and the asset identifiers $ID\_j\_1$ to $ID\_j\_m$ correspond to asset amounts $t\_j\_1$ to $t\_j\_m$, random numbers $r\_j\_1$ to $r\_j\_m$, and asset commitments $PC(t\_j\_1, r\_j\_1)$ to $PC(t\_j\_m, r\_j\_m)$, the covered assets $ID\_i\_1$ to $ID\_i\_m$ correspond to asset commitments $PC\{i, 1\}$ to $PC\{i, m\}$, and payees $Q\_1$ to $Q\_u$ correspond to transfer amounts $t'\_1$ to $t'\_u$, random numbers $r'\_1$ to $r'\_u$, and transfer amount commitments $PC(t'\_1, r'\_1)$ to $PC(t'u, r'\_u)$, where $u \geq 1$.

Optionally, the linkable ring signature further includes a key image $I\_(m+1)=r''\times\text{Hash\_G}(P''\_j)$; and the transaction execution condition further includes: the key image $I\_(m+1)$ does not belong to the historical key image set.

Optionally, the real remitter generates intermediate parameters $L\_j\_d$, $R\_j\_d$, $L\_j\_(m+1)$, and $R\_j\_(m+1)$ corresponding to the real remitter and intermediate parameters $L\_i\_d$, $R\_i\_d$, $L\_i\_(m+1)$, and $R\_i\_(m+1)$ corresponding to the fake remitter i based on the private key $x\_j$, the public key $P\_j$, the pseudo private key $r''$, and the pseudo public key $P''\_j$ corresponding to the real remitter and the public key $P\_i$ and the pseudo public key $P'''\_i$ corresponding to the fake remitter i, and generates the linkable ring signature based on a random number and/or its derived value related to values of the intermediate parameters $L\_j\_d$, $R\_j\_d$, $L\_j\_(m+1)$, $R\_j\_(m+1)$, $L\_i\_d$, $R\_i\_d$, $L\_i\_(m+1)$, and $R\_i\_(m+1)$, where $d \in [1, m]$, and the signature verification unit 1203 is specifically configured to: calculate the intermediate parameters $L\_j\_d$, $R\_j\_d$, $L\_j\_(m+1)$, $R\_j\_(m+1)$, $L\_i\_d$, $R\_i\_d$, $L\_i\_(m+1)$, and $R\_i\_(m+1)$ based on random numbers and/or its derived values included in the ring signature, to verify whether the intermediate parameters $L\_j\_d$ and $L\_i\_d$ satisfy a ring value rule, whether the intermediate parameters $L\_j\_(m+1)$ and $L\_i\_(m+1)$ satisfy the ring value rule, whether the intermediate parameters $R\_j\_d$ and $R\_i\_d$ satisfy the ring value rule, and whether the intermediate parameters $R\_j\_(m+1)$ and $R\_i\_(m+1)$ satisfy the ring value rule.

Optionally, $P\_j = x\_j \times G$, G is a base point of an elliptic curve, $|G| = p$, p is a prime number, and $0 < x\_j < p$; the random numbers and/or its derived values included in the ring signature include $s\_k\_1$ to $s\_k(m+1)$ and $c\_1$, where $k \in [1, n]$; the ring value rule between the intermediate parameters $L\_j\_d$ and $L\_i\_d$ includes $L\_k\_d = (s\_k\_d \times G + c\_k \times P\_k) \bmod p$, where $s\_k\_d$ belongs to a number field $Z\_q$ in which the elliptic curve is located, and Hash( ) is a hash function from the elliptic curve to the number field $Z\_q$; the ring value rule between the intermediate parameters $L\_j\_(m+1)$ and $L\_i\_(m+1)$ includes $L\_k\_(m+1) = [s\_k(m+1) \times G + c\_k \times P''\_k] \bmod p$, where $s\_k(m+1)$ belongs to the number field $Z\_q$; the ring value rule between the intermediate parameters $R\_j\_d$ and $R\_i\_d$ includes $R\_k\_d = (s\_k\_d \times \text{Hash}\_G(P\_k, ID\_k\_d) + c\_k \times I\_d) \bmod p$, where $I\_d$ is included in the ring signature; the ring value rule between the intermediate parameters $R\_j\_(m+1)$ and $R\_i\_(m+1)$ includes $R\_k\_(m+1) = [s\_k(m+1) \times \text{Hash}\_G(P'''\_k) + c\_k \times I\_(m+1)] \bmod p$, where $I\_(m+1)$ is included in the ring signature; and when $h=1$, $c\_1 = \text{Hash}(M, L\_n\_1, R\_n\_1, \ldots, L\_n\_(m+1), R\_n\_(m+1))$, and when $h \in [2, n]$, $c\_k = \text{Hash}(M, L\_(h-1)\_1, R\_(h-1)\_1, \ldots, L\_(h-1)\_(m+1), R\_(h-1)\_(m+1))$.

Optionally, the device further includes the following: an asset deletion unit 1207, configured to delete at least some of spent assets in an account corresponding to any participant from the blockchain ledger based on an asset deletion request initiated by the any participant to a blockchain network.

The system, device, module, or unit illustrated in the previous implementations can be specifically implemented by using a computer chip or an entity, or can be implemented by using a product having a certain function. A typical implementation device is a computer, and the computer can be a personal computer, a laptop computer, a cellular phone, a camera phone, a smartphone, a personal digital assistant, a media player, a navigation device, an email receiving and sending device, a game console, a tablet computer, a wearable device, or any combination of these devices.

In a typical configuration, the computer includes one or more processors (CPU), input/output interfaces, network interfaces, and memories.

The memory can include a non-persistent memory, a random access memory (RAM), a nonvolatile memory, and/or another form that are in a computer readable medium, for example, a read-only memory (ROM) or a flash memory (flash RAM). The memory is an example of the computer readable medium.

The computer readable medium includes persistent, non-persistent, removable, and irremovable media that can store information by using any method or technology. The information can be a computer readable instruction, a data structure, a program module, or other data. A computer storage medium includes but is not limited to a parameter random access memory (PRAM), a static random access memory (SRAM), a dynamic random access memory (DRAM), another type of random access memory (RAM), a read-only memory (ROM), an electrically erasable programmable read-only memory (EEPROM), a flash memory or another memory technology, a compact disc read-only memory (CD-ROM), a digital versatile disc (DVD) or other optical storage, a magnetic tape, magnetic disk storage, a quantum memory, a graphene-based storage medium, another magnetic storage device, or any other non-transmission medium. The computer storage medium can be used to store information that can be accessed by a computing device. Based on the definition in the present specification, the computer readable medium does not include transitory computer readable media (transitory media) such as a modulated data signal and carrier.

It is worthwhile to further note that the terms "include", "comprise", and their any other variants are intended to cover a non-exclusive inclusion, so that a process, a method, a product, or a device that includes a list of elements not only includes those elements but also includes other elements which are not expressly listed, or further includes elements inherent to such process, method, product, or device. Without more constraints, an element preceded by "includes a . . . " does not preclude the existence of additional identical elements in the process, method, product, or device that includes the element.

Specific implementations of the present specification are described above. Other implementations fall within the scope of the appended claims. In some cases, the actions or steps described in the claims can be performed in an order different from the order in the implementations and the desired results can still be achieved. In addition, the process described in the accompanying drawings does not necessarily require a particular execution order to achieve the desired results. In some implementations, multi-tasking and parallel processing can be advantageous.

The terms used in the one or more implementations of the present specification are for the sole purpose of describing the particular implementations and are not intended to limit the one or more implementations of the present specification. The terms "a" and "the" of singular forms used in the one or more implementations of the present specification and the appended claims are also intended to include plural forms, unless otherwise specified in the context clearly. It should be further understood that the term "and/or" used in the present specification indicates and includes any or all possible combinations of one or more associated listed items.

It should be understood that although terms "first", "second", "third", etc. can be used in the present specification to describe various types of information, the information is not limited to these terms. These terms are only used to distinguish between information of the same type. For example, without departing from the scope of the one or more implementations of the present specification, first information can also be referred to as second information, and similarly, the second information can be referred to as the first information. Depending on the context, for example, the word "if" used here can be explained as "while", "when", or "in response to determining".

The previous descriptions are only example implementations of the one or more implementations of the present specification, but are not intended to limit the one or more implementations of the present specification. Any modification, equivalent replacement, improvement, etc. made without departing from the spirit and principle of the one or more implementations of the present specification shall fall within the protection scope of the one or more implementations of the present specification.

What is claimed is:

1. A computer-implemented method comprising:
assembling, by a computing device communicably coupled to a blockchain network or in the blockchain network, a remittance transaction based on one or more to-be-spent assets in an account corresponding to a first remitter in the remittance transaction, one or more assets in an account corresponding to a fake remitter, and one or more encrypted transfer amounts, each encrypted transfer amount corresponding to a transfer amount corresponding to a respective payee of one or more payees in the remittance transaction, wherein assets of the first remitter, assets of the fake remitter, and assets of the one or more payees are in a blockchain ledger of the blockchain network,
wherein the first remitter is a real participant in the remittance transaction, the fake remitter is a fake participant in the remittance transaction, and the one or more payees comprise one or more real payees, the one or more real payees being real participants in the remittance transaction;
maintaining, by the computing device, a private key of the first remitter and a public key of the first remitter;
generating, by the computing device, a plurality of key images, a value of each key image being cryptographically related to the private key of the first remitter, the public key of the first remitter, and a respective asset identifier of a to-be-spent asset of the one or more to-be-spent assets;
generating, by the computing device, one or more other values based on a public key of the fake remitter; and
submitting, by the computing device, the remittance transaction and a linkable ring signature to the blockchain network, wherein the linkable ring signature comprises the generated plurality of key images and the generated one or more other values.

2. The method of claim 1, wherein the one or more payees comprise a fake payee, the fake payee being a fake participant in the remittance transaction, and wherein a transfer amount corresponding to the fake payee is 0.

3. The method of claim 1, wherein the plurality of key images are $I_1$ to $I_m$, the public key of the first remitter is $P_j$, the private key of the first remitter is $x_j$, and asset identifiers of the one or more to-be-spent assets are $ID_1$ to $ID_m$, and wherein the plurality of key images are generated using the following equation:
$I_d = x_j \times \text{Hash}_G(P_j, ID_{j,d}), d \in [1, m]$, wherein $\text{Hash}_G(\ )$ is a hash function from an elliptic curve to the elliptic curve.

4. The method of claim 1, further comprising:
generating, by the computing device, a corresponding range proof for each transfer amount corresponding to each payee, and
including, by the computing device, the corresponding range proof for each transfer amount in the remittance transaction, wherein the corresponding range proof for each transfer amount proves that the transfer amount is not less than 0.

5. The method of claim 1, wherein generating the one or more other values based on the public key of the fake remitter comprises:
determining a first pseudo public key $P'''_j$ corresponding to the first remitter, wherein $P'''_j = [PC(t_{j,1}, r_{j,1}) + \ldots + PC(t_{j,m}, r_{j,m})] - [PC(t'_1, r'_1) + \ldots + PC(t'_u, r'_u)]$, wherein $t_{j,1}$ to $t_{j,m}$ are asset amounts corresponding to the one or more to-be-spent assets of the first remitter, $r_{j,1}$ to $r_{j,m}$ are random numbers, $PC(t_{j,1}, r_{j,1})$ to $PC(t_{j,m}, r_{j,m})$ are corresponding encrypted asset amounts of the one or more to-be-spent assets of the first remitter, $t'_1$ to $t'_u$ are transfer amounts corresponding to payees $Q_1$ to $Q_u$, $r'_1$ to $r'_u$ are random numbers, and $PC(t'_1, r'_1)$ to $PC(t'_u, r'_u)$ are encrypted transfer amounts corresponding to each payee in the one or more payees;
determining a pseudo private key $r''= (r_{j,1} + \ldots + r_{j,m}) - (r'_1 + \ldots + r'_u)$;
determining a second pseudo public key $P'''_i$ corresponding to the fake remitter, wherein $P'''_i = [PC_{i,1} + \ldots + PC_{i,m}] - [PC(t'_1, r'_1) + \ldots + PC(t'_u, r'_u)]$, and wherein $PC_{i,1}$ to $PC_{i,m}$ are encrypted asset amounts of the one or more assets in the account corresponding to the fake remitter; and
generating the one or more other values based on the pseudo private key $r''$, the first pseudo public key $P'''_j$, and the second pseudo public key $P'''_i$.

6. The method of claim 5, wherein generating the one or more other values based on the public key of the fake remitter comprises generating an additional key image $I_{m+1}$, by
generating, by the computing device, $I_{m+1} = r'' \times \text{Hash}_G(P'''_j)$, wherein $\text{Hash}_G(\ )$ is a hash function from an elliptic curve to the elliptic curve.

7. The method of claim 5, wherein generating the one or more other values based on the public key of the fake remitter comprises:
generating intermediate parameters $L_{j,d}$, $R_{j,d}$, $L_{j,m+1}$, and $R_{j,m+1}$ corresponding to the first remitter;
generating intermediate parameters $L_{i,d}$, $R_{i,d}$, $L_{i,m+1}$, and $R_{i,m+1}$ corresponding to the fake remitter, wherein $d \in [1, m]$, wherein the intermediate parameters $L_{j,d}$ and $L_{i,d}$ satisfy a ring value rule, wherein the intermediate parameters $L_{j,m+1}$ and $L_{i,m+1}$ satisfy the ring value rule, wherein the intermediate parameters $R_{j,d}$ and $R_{i,d}$ satisfy the ring value rule, and wherein the intermediate parameters $R_{j,m+1}$ and $R_{i,m+1}$ satisfy the ring value rule; and
generating the one or more other values based on $L_{i,d}$, $R_{i,d} L_{i,m+1}$, $R_{i,m+1}$, $L_{i,d}$, $R_{i,d}$, $L_{i,m+1}$, and $R_{i,m+1}$.

8. A non-transitory, computer-readable medium storing one or more instructions that, when executed by a computing device communicably coupled to a blockchain network or in the blockchain network, cause the computing device to perform operations comprising:
assembling a remittance transaction based on one or more to-be-spent assets in an account corresponding to a first remitter in the remittance transaction, one or more assets in an account corresponding to a fake remitter, and one or more encrypted transfer amounts, each encrypted transfer amount corresponding to a transfer amount corresponding to a respective payee of one or more payees in the remittance transaction, wherein assets of the first remitter, assets of the fake remitter, and assets of the one or more payees are in a blockchain ledger of the blockchain network,
wherein the first remitter is a real participant in the remittance transaction, the fake remitter is a fake participant in the remittance transaction, and the one or more payees comprise one or more real payees, the one or more real payees being real participants in the remittance transaction;

maintaining a private key of the first remitter and a public key of the first remitter;

generating a plurality of key images, a value of each key image being cryptographically related to the private key of the first remitter, the public key of the first remitter, and a respective asset identifier of a to-be-spent asset of the one or more to-be-spent assets;

generating one or more other values based on a public key of the fake remitter; and submitting the remittance transaction and a linkable ring signature to the blockchain network, wherein the linkable ring signature comprises the generated plurality of key images and the generated one or more other values.

9. The non-transitory, computer-readable medium of claim 8, wherein the one or more payees comprise a fake payee, the fake payee being a fake participant in the remittance transaction, and wherein a transfer amount corresponding to the fake payee is 0.

10. The non-transitory, computer-readable medium of claim 8, wherein the plurality of key images are $I_1$ to $I_m$, the public key of the first remitter is $P_j$, the private key of the first remitter is $x_j$, and asset identifiers of the one or more to-be-spent assets are $ID_1$ to $ID_m$, and wherein the plurality of key images are generated using the following equation:

$I_d = x_j \times Hash_G(P_j, ID_{j,d})$, $d \in [1, m]$, wherein $Hash_G( )$ is a hash function from an elliptic curve to the elliptic curve.

11. The non-transitory, computer-readable medium of claim 8, wherein the operations further comprise:

generating a corresponding range proof for each transfer amount corresponding to each payee, and including the corresponding range proof for each transfer amount in the remittance transaction, wherein the corresponding range proof for each transfer amount proves that the transfer amount is not less than 0.

12. The non-transitory, computer-readable medium of claim 8, wherein generating the one or more other values based on the public key of the fake remitter comprises:

determining a first pseudo public key $P'''_j$ corresponding to the first remitter, wherein $P'''_j = [PC(t_{j,1}, r_{j,1}) + \ldots + PC(t_{j,m}, r_{j,m})] - [PC(t'_1, r'_1) + \ldots + PC(t'_u, r'_u)]$, wherein $t_{j,1}$ to $t_{j,m}$ are asset amounts corresponding to the one or more to-be-spent assets of the first remitter, $r_{j,1}$ to $r_{j,m}$ are random numbers, $PC(t_{j,1}, r_{j,1})$ to $PC(t_{j,m}, r_{j,m})$ are corresponding encrypted asset amounts of the one or more to-be-spent assets of the first remitter, $t'_1$ to $t'_u$ are transfer amounts corresponding to payees $Q_1$ to $Q_u$, $r'_1$ to $r'_u$ are random numbers, and $PC(t'_1, r'_1)$ to $PC(t'_u, r'_u)$ are encrypted transfer amounts corresponding to each payee in the one or more payees;

determining a pseudo private key $r''' = (r_{j,1} + \ldots + r_{j,m}) - (r'_1 + \ldots + r'_u)$;

determining a second pseudo public key $P'''_i$ corresponding to the fake remitter, wherein $P'''_i = [PC_{i,1} + \ldots + PC_{i,m}] - [PC(t'_1, r'_1) + \ldots + PC(t'_u, r'_u)]$, and wherein $PC_{i,1}$ to $PC_{i,m}$ are encrypted asset amounts of the one or more assets in the account corresponding to the fake remitter; and generating the one or more other values based on the pseudo private key $r'''$, the first pseudo public key $P'''_j$, and the second pseudo public key $P'''_i$.

13. The non-transitory, computer-readable medium of claim 12, wherein generating the one or more other values based on the public key of the fake remitter comprises generating an additional key image $I_{m+1}$, by:

generating $I_{m+1} = r''' \times Hash_G(P'''_j)$, wherein $Hash_G( )$ is a hash function from an elliptic curve to the elliptic curve.

14. The non-transitory, computer-readable medium of claim 12, wherein generating the one or more other values based on the public key of the fake remitter comprises:

generating intermediate parameters $L_{j,d}$, $R_{j,d}$, $L_{j,m+1}$, and $R_{j,m+1}$ corresponding to the first remitter;

generating intermediate parameters $L_{i,d}$, $R_{i,d}$, $L_{i,m+1}$, and $R_{i,m+1}$ corresponding to the fake remitter, wherein $d \in [1, m]$, wherein the intermediate parameters $L_{i,d}$ and $L_{i,d}$ satisfy a ring value rule, wherein the intermediate parameters $L_{j,m+1}$ and $L_{i,m+1}$ satisfy the ring value rule, wherein the intermediate parameters $R_{j,d}$ and $R_{i,d}$ satisfy the ring value rule, and wherein the intermediate parameters $R_{j,m+1}$ and $R_{i,m+1}$ satisfy the ring value rule; and generating the one or more other values based on $L_{i,d}$, $R_{i,d}$, $L_{i,m+1}$, $R_{i,m+1}$, $L_{i,d}$, $R_{i,d}$, $L_{i,m+1}$, and $R_{i,m+1}$.

15. A computer-implemented system, comprising:

one or more computers communicably coupled to a blockchain network or in the blockchain network; and one or more computer memory devices interoperably coupled with the one or more computers and having tangible, non-transitory, machine-readable media storing one or more instructions that, when executed by the one or more computers, cause the one or more computers to perform operations comprising:

assembling a remittance transaction based on one or more to-be-spent assets in an account corresponding to a first remitter in the remittance transaction, one or more assets in an account corresponding to a fake remitter, and one or more encrypted transfer amounts, each encrypted transfer amount corresponding to a transfer amount corresponding to a respective payee of one or more payees in the remittance transaction, wherein assets of the first remitter, assets of the fake remitter, and assets of the one or more payees are in a blockchain ledger of the blockchain network, wherein the first remitter is a real participant in the remittance transaction, the fake remitter is a fake participant in the remittance transaction, and the one or more payees comprise one or more real payees, the one or more real payees being real participants in the remittance transaction;

maintaining a private key of the first remitter and a public key of the first remitter;

generating a plurality of key images, a value of each key image being cryptographically related to the private key of the first remitter, the public key of the first remitter, and a respective asset identifier of a to-be-spent asset of the one or more to-be-spent assets;

generating one or more other values based on a public key of the fake remitter; and submitting the remittance transaction and a linkable ring signature to the blockchain network, wherein the linkable ring signature comprises the generated plurality of key images and the generated one or more other values.

16. The computer-implemented system of claim 15, wherein the one or more payees comprise a fake payee, the fake payee being a fake participant in the remittance transaction, and wherein a transfer amount corresponding to the fake payee is 0.

17. The computer-implemented system of claim 15, wherein the plurality of key images are $I_1$ to $I_m$, the public key of the first remitter is $P_j$, the private key of the first remitter is $x_j$, and asset identifiers of the one or more to-be-spent assets are $ID_1$ to $ID_m$, and wherein the plurality of key images are generated using the following equation:

$I_d = x_j \times Hash_G(P_j, ID_{j,d})$, $d \in [1, m]$, wherein $Hash_G( )$ is a hash function from an elliptic curve to the elliptic curve.

18. The computer-implemented system of claim 15, wherein the operations further comprise:
generating a corresponding range proof for each transfer amount corresponding to each payee, and
including the corresponding range proof for each transfer amount in the remittance transaction, wherein the corresponding range proof for each transfer amount proves that the transfer amount is not less than 0.

19. The computer-implemented system of claim 15, wherein generating the one or more other values based on the public key of the fake remitter comprises:
determining a first pseudo public key $P'''_j$ corresponding to the first remitter, wherein $P'''_j = [PC(t_{j,1}, r_{j,1}) + \ldots + PC(t_{j,m}, r_{j,m})] - [PC(t'_1, r'_1) + \ldots + PC(t'_u, r'_u)]$, wherein $t_{j,1}$ to $t_{j,m}$ are asset amounts corresponding to the one or more to-be-spent assets of the first remitter, $r_{j,1}$ to $r_{j,m}$ are random numbers, $PC(t_{j,1}, r_{j,1})$ to $PC(t_{j,m}, r_{j,m})$ are corresponding encrypted asset amounts of the one or more to-be-spent assets of the first remitter, $t'_1$ to $t'_u$ are transfer amounts corresponding to payees $Q_1$ to $Q_u$, $r'_1$ to $r'_u$ are random numbers, and $PC(t'_1, r'_1)$ to $PC(t'_u, r'_u)$ are encrypted transfer amounts corresponding to each payee in the one or more payees participants;
determining a pseudo private key $r'' = (r_{j,1} + \ldots + r_{j,m}) - (r'_1 + \ldots + r'_u)$;
determining a second pseudo public key $P'''_i$ corresponding to the fake remitter, wherein $P'''_i = [PC_{i,1} + \ldots + PC_{i,m}] - [PC(t'_1, r'_1) + \ldots + PC(t'_u, r'_u)]$, and wherein $PC_{i,1}$ to $PC_{i,m}$ are encrypted asset amounts of the one or more assets in the account corresponding to the fake remitter; and
generating the one or more other values based on the the pseudo private key $r''$, the first pseudo public key $P'''_j$, and the second pseudo public key $P'''_i$.

* * * * *

UNITED STATES PATENT AND TRADEMARK OFFICE
CERTIFICATE OF CORRECTION

PATENT NO. : 11,238,447 B2  
APPLICATION NO. : 16/805179  
DATED : February 1, 2022  
INVENTOR(S) : Wenbin Zhang Page 1 of 1

It is certified that error appears in the above-identified patent and that said Letters Patent is hereby corrected as shown below:

In the Claims

Column 36, Line 6, in Claim 5, delete "$(t'_u, r'_u)$" and insert -- $(t'_u, r'_u)$ --.

Column 36, Lines 48-49, in Claim 7, delete "$L_{i,d}, R_{i,d}, L_{i,m+1}, R_{i,m+1}$," and insert -- $L_{j,d}, R_{j,d}, L_{j,m+1}, R_{j,m+1}$ --.

Column 37, Line 45, in Claim 12, delete "$(t_{j,m}, r_{j,m})$" and insert -- "$(t_{j,m}, r_{j,m})$ --.

Column 37, Line 45, in Claim 12, delete "$(t'_u, r'_u)$" and insert -- $(t'_u, r'_u)$ --.

Column 38, Line 13, in Claim 14, delete "$L_{i,d}$" and insert -- $L_{j,d}$ --.

Column 38, Lines 20-21, in Claim 14, delete "$L_{i,d}, R_{i,d}, L_{i,m+1}, R_{i,m+1}$," and insert -- $L_{j,d}, R_{j,d}, L_{j,m+1}, R_{j,m+1}$ --.

Column 39, Line 21, in Claim 19, delete "$(t_{j,m}, r_{j,m})$" and insert -- "$(t_{j,m}, r_{j,m})$ --.

Column 39, Line 21, in Claim 19, delete "$(t'_u, r'_u)$" and insert -- $(t'_u, r'_u)$ --.

Column 40, Line 11, in Claim 19, delete "$(r'_1 + ... r'_u);$" and insert -- $(r'_1 + ... + r'_u);$ --.

Column 40, Line 18, in Claim 19, delete "the the" and insert -- the --.

Signed and Sealed this  
Twenty-eighth Day of June, 2022

Katherine Kelly Vidal  
*Director of the United States Patent and Trademark Office*